US005729605A

United States Patent [19]

Bobisuthi et al.

[11] Patent Number: 5,729,605

[45] Date of Patent: Mar. 17, 1998

[54] HEADSET WITH USER ADJUSTABLE FREQUENCY RESPONSE

[75] Inventors: James F. Bobisuthi, Boulder Creek; Kangsee Woo, Freedom; Thomas T. Czepowicz, Santa Cruz; Scott F. Burr, Felton, all of Calif.

[73] Assignee: Plantronics, Inc., Santa Cruz, Calif.

[21] Appl. No.: 460,282

[22] Filed: Jun. 19, 1995

[51] Int. Cl.[6] .............................. H04M 1/00; H04R 25/00

[52] U.S. Cl. .......................... 379/430; 379/433; 381/183; 381/187

[58] Field of Search ..................................... 381/183, 187, 381/25, 68.6, 158, 159; 379/433, 434, 428, 447, 430; 181/128, 129, 137, 138

[56] References Cited

U.S. PATENT DOCUMENTS

| | | | |
|---|---|---|---|
| 3,999,020 | 12/1976 | Bastiaans et al. | 179/180 |
| 4,027,116 | 5/1977 | Nakamura | 179/180 |
| 4,654,637 | 3/1987 | Schantz | 379/447 |
| 4,742,887 | 5/1988 | Yamagishi | 381/158 |
| 4,867,267 | 9/1989 | Carlson | 181/130 |
| 5,402,486 | 3/1995 | Wang et al. | 379/433 |

FOREIGN PATENT DOCUMENTS

| | | |
|---|---|---|
| 0372883 A3 | 6/1990 | European Pat. Off. . |
| 820186675 | 5/1984 | Japan . |

OTHER PUBLICATIONS

Bauer, B.B., "Equivalent Circuit Analysis of Mechano-Acoustic Structures, Journal of the Audio Engineering Society", Reprinted from Transactions of the IRE, vol. AU-2, pp. 112–120, Jul.–Aug., 1954.

*Primary Examiner*—Jack Chiang
*Attorney, Agent, or Firm*—Fenwick & West LLP

[57] ABSTRACT

A headset provides for user selectable switching between various frequency responses for the headset through manipulation of mechanical acoustic elements of the headset. The acoustic elements allow adjustment of the transmission paths between a transducer element in the headset and the user's ear canal, and adjustment of the resonant characteristics of the headset housing itself. Adjustment of the transmission path is made by manipulation of ports and openings in and between various volumes containing the transducer and the ear canal, and through the use of various resistant elements along such transmission paths. The user is able to independently and mechanically alter the inductance and resistance along the transmission path, and thereby independently control the high and low frequency response of the headset. Adjustment of the headset resonance is also made by manipulation of ports between interior volumes and external ports, and through variation in the size of the interior volume of the headset, thereby and increasing or decreasing the compliance of transducer. The acoustic switching may be embodied with either discrete or continuous adjustment of the acoustic elements of the headset.

3 Claims, 24 Drawing Sheets

HEADSET WITH USER ADJUSTABLE FREQUENCY RESPONSE

BACKGROUND

1. Field of Invention

This invention relates to the field of headset design, and more particularly, to headsets that allow the user to adjust the frequency response of the headset during operation.

2. Background of Invention

Headsets are commonly used in a variety of applications to provide audio information related to the application domain to a headset user. Headsets are used in telecommunication, computer based-telephony, audio entertainment, and many other areas. Conventionally, the frequency response of a headset is either fixed or variable to a small degree, and designed to accommodate the quality of the source signal, the type of operating environment, the type of users, and other factors.

In a headset with a fixed frequency response, the frequency response is shaped by the careful selection or design of a receiver transducer, and by design of fixed acoustic volumes and ports in the housing containing the receiver. While this approach generally results in an acceptable frequency response for a given quality of source signal, environment, and user, it does not allow a user to alter the frequency response of the headset as desired to improve the user's ability to hear or understand the audio information. Such user adjustment is particularly desirable where the headset is employed in environments which have high or variable noise levels, or where the signal quality of the audio information varies as a result of conditions in the origination or transmission of the signal to the headset.

Conventionally, user adjustment of frequency response is provided by electrical means, generally by including one or more filter circuits with electrical properties that can be manipulated by a user adjustable potentiometer or similar electrical device. While this approach may provide for limited user control over the frequency response of the headset, it presents a number of problems. In telecommunications applications it is desirable to have a steep frequency roll-off at the band limits. This generally requires an electronic filter with four or more poles. Such filters inherently require a large number of components, and are difficult to embody in an integrated circuit. In addition, there is the need for the user adjustable potentiometer. These various components increase the cost of the headset, which may exceed the benefit of providing user adjustment. Further, in many headsets, there are no active components in the receiver circuit, and no source of power for the active components needed for a user adjustable circuit. Providing an adjustable electronic filter for these types of headsets is extremely expensive.

Second, conventional headsets operate with very low voltage and current levels. These low power devices increase the likelihood of undesirable distortion in an electronic filter. This makes the design of such a filter thereby more complicated because any filter will add a small amount of noise to the signal. Also, the low power design of headsets means that additional power is generally needed for active filter components. This increases the complexity of the device, along with the power consumption requirements.

Accordingly, it is desirable to provide a headset that allows for user adjustment of the frequency response with lower cost and complexity than through the use of electronic filters, and without introducing the additional noise and power consumption requirements of such electronic filters.

SUMMARY OF THE INVENTION

The present invention overcomes the foregoing limitations by providing a headset with a frequency response that is adjustable entirely by mechanical alteration of the structural configuration of the headset housing, resulting in acoustic switching between a number of frequency responses. Generally, acoustic switching provides the headset user with a various mechanical means of reconfiguring the acoustic circuit of the headset, as well as a mechanical means of selecting between acoustic elements with different values to achieve various predefined frequency responses. It allows the user to select among various frequency responses at will to suit differences in signal source quality and preference. Acoustic switching may be embodied in either discrete arrangements, where the user selects from a limited number of configurations of the headset, each having a particular frequency response, or in continuous adjustment arrangements, where the user may continuously alter the configuration of the headset over a range of positions and frequency responses.

Acoustic switching is used to alter the transmission path and headset resonant frequency, to provide user control over both high and low frequency responses. Acoustic switching in the transmission path is achieved through providing a headset with an interior volume containing a transducer that projects through a number of openings in a front cover. A faceplate is movably attached to the front cover and also has a number of openings, preferably some openings being smaller than the openings in the front cover, and others being larger. The user can move the faceplate with respect to the front cover so that either the small faceplate openings align with openings on the front cover, or the large openings align. When the small openings align, resistance and inductance increase in the transmission path causing high frequency roll-off. Aligning the larger openings extends the high frequency response. The size, shape, number, and orientation of the openings can be varied to produce a number of different frequency response profiles.

Adjustment of the resonant frequency of a headset is achieved through adjustment in the size and porting of interior volumes of the headset that acoustically communicate with the transducer. Various ports may be located between interior volumes, or between interior and exterior volumes, including free air volumes surrounding the headset, and air volumes in the in the ear canal. The ports are disposed on portions of the headset housing that are movably coupled to one another, such as an inner housing, and an outer cap. A single port on an inner housing containing the transducer may be selectably aligned with any one of several ports on the outer cap, each such port acoustically coupling the transducer to selected other volumes, thereby creating variable ports and leakage in the inner housing. In this manner, the user is able to selectively control the low frequency response of the headset.

Low frequency response may further be adjusted by the user through the direct alteration of the size of one or more interior volumes containing the transducer. Increasing the volume surrounding the transducer increases compliance, and extends low frequency response; decreasing the volume produces the opposite effect. The interior volume of a headset may be modified using pistons, bellows, or switched volumes. Both pistons and bellows may be controlled using a cam follower and cam profile arrangement. The user can control the position of the cam followers along the cam profile, which raises or lower the piston or bellows into the interior volume. In a switched volume configuration, the user can couple a first interior volume containing the transducer to a second interior volume.

The acoustic switching methods and apparatuses of the present invention further provide for control over the particular variation in resistance, inductance, and compliance. Resistance can be selectively controlled by mechanically varying the dimensions of individual ports or openings between acoustic volumes. Inductance can be selectively controlled by mechanically varying the total overall cross-sectional areas or length of all ports or openings between acoustic volumes. These acoustic parameters of inductance, resistance, and compliance may all be independently or jointly controlled to provide the user with a rich variety of selectable frequency responses.

DETAILED DESCRIPTION OF THE INVENTION

The present invention provides various methods of acoustic switching that allow a user to adjust the overall frequency response of a headset through mechanical manipulations of the components of the headset that alter the acoustic circuit of the headset, and hence its overall frequency response. User adjustment of the frequency response of a headset is preferably accomplished by modifying either the characteristics of a transmission path between a transducer in the headset and the ear canal, or by modifying the resonant characteristics of the housing itself, or by a combination of these approaches. Such modification are made by adjusting the positioning, size, shape, and acoustic communication between various acoustic elements in the headset. These acoustic elements include various interior and exterior volumes, and ports or openings to and between such volumes.

Acoustic switching as applied to the housing resonance is primarily effective for altering the low frequency response. This is preferably done by venting the housing through selective alteration of ports or changing the size of the interior volume of the housing in order to change the compliance of the headset transducer, altering the resonant frequency of the headset.

Acoustic switching as applied to the transmission path is effective to alter both the high and low frequency response characteristics of the headset by altering the resistance, inductance or compliance of the headset. High frequency response can be adjusted through the manipulation of size, shape, and location of ports or openings along the transmission path. Low frequency response can be adjusted by controlling the amount and source of leakage from the transmission path to the free air outside of the headset housing, or to an interior volume of the housing.

The foregoing acoustic switching techniques may be used independently, or integrated, such that several different acoustic parameters are adjusted simultaneously through a single physical control mechanism.

In addition, the rate and range of adjustment is also configurable. Adjustment of the frequency response characteristics may be provided by switching between discrete acoustic configurations, or by continuous adjustment over a range of acoustic configurations. Discrete acoustic switching provides for increased ease of use by the user. For unsophisticated users discrete adjustments are probably preferable, and can be more easily designed to avoid undesirable combinations of various acoustic parameters that may arise during the adjustment of multiple acoustic parameters simultaneously. While continuous acoustic adjustment provides the user a greater degree of control, the added operational and mechanical complexity makes discrete acoustic switching more attractive for most applications.

Adjustment of Transmission Path Characteristics

Figure 1B:
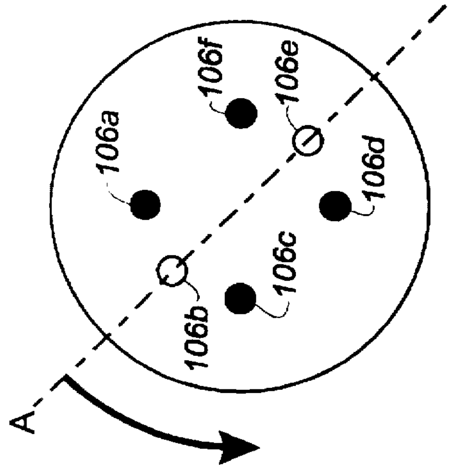
FIGS. 1*a* through 1*c* are illustrations of a headset with acoustic switching along the transmission path using a rotatable faceplate.
Figure 1C:
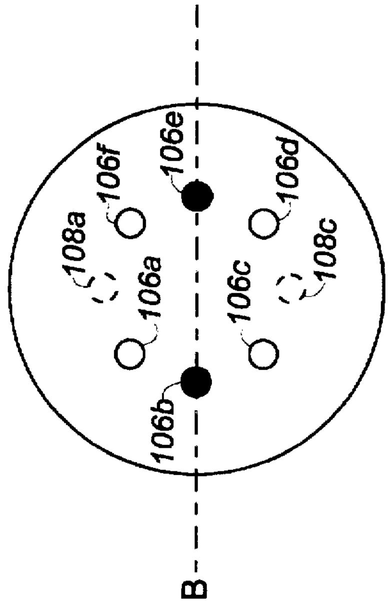
Figure 1A:
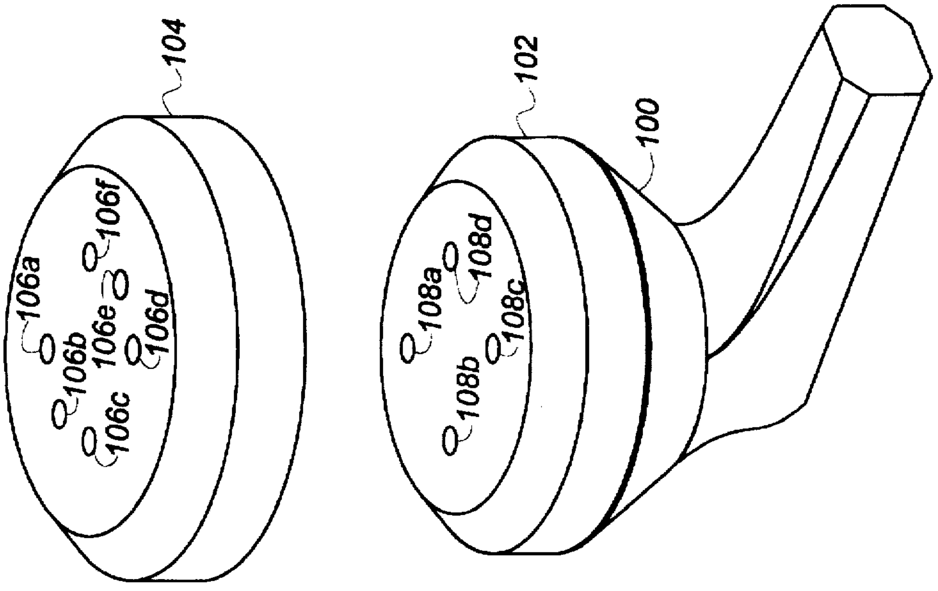

Referring now to FIG. 1*a*, there is shown an embodiment of a headset with acoustic switching to control high frequency response through alteration of the transmission path. A headset housing 100 contains a transducer (not shown) for transmitting sound from the headset to an ear canal of a user. The housing 100 includes an inner cap 102 that encloses a side of the transducer facing the ear canal. Passing through the inner cap 102 are a number of openings 108. The openings 108 allow sound to pass from the transducer to the ear. An outer cap 104 rests on top of the inner cap 102, and is rotatably attached thereto, so that the outer cap 104 may be rotated by the user with respect to the inner cap 102. In alternate embodiments, the outer cap 104 may remain fixed, and the inner cap 102 be rotatable with respect to it. The outer cap 104 also contains a number of openings 106. The size, shape, number, and location of the openings 106, 108 is variable; six openings 106 and four openings 108 have been illustrated merely to demonstrate the principle of this aspect of the invention. In other embodiments, a larger number of openings may be provided on either the outer cap 104 or the inner cap 102.

To provide acoustic switching, outer cap 104 may be positioned at one of two positions with respect to inner cap 102. FIGS. 1*b* and 1*c* illustrate these positions. In FIG. 1*b*, four openings 106*a*, 106*c*, 106*d*, and 106*f* of outer cap 104 are aligned with the four openings 108 of the inner cap. This position provides a first frequency response, resulting from a predetermined resistance and inductance in the acoustic circuit of the headset, as determined by the size and shape of the openings 106, 108, assuming the volume, and porting of the headset 100 are fixed. The outer cap 104 may be rotated by the user with respect to the inner cap 102 so that the openings 106, 108 align as illustrated in FIG. 1*c*. Here, only openings 106*b* and 106*e* align with openings 108*b* and 108*d* of the inner cap 102 respectively. The remaining openings 108*a* and 108*c* of the inner cap 102 are sealed by an interior surface of the outer cap 104. In this position, the headset has a second frequency response, again, resulting from predetermined acoustic parameters of the rest of the headset 100. While FIGS. 1*a–c* illustrate only two positions of the headset 100, in alternate embodiments, a larger number of discrete positions may be provided to afford selection of several different frequency responses by the user.

The number of openings 108 on the inner cap 102 that are exposed can be varied by altering the pattern of openings 106 on the outer cap 104. This alters the effective series acoustic inductance and resistance of the transmission path between the output of the headset 100 and the ear canal. Likewise, the shape of the openings 106, 108 may be varied, altering the acoustic resistance, or the size of the openings 106, 108 may be varied, altering the resistance and inductance of the headset 100. FIGS. 4*a* through FIG. 4*f* illustrate generally these structural variations.

Figure 3:
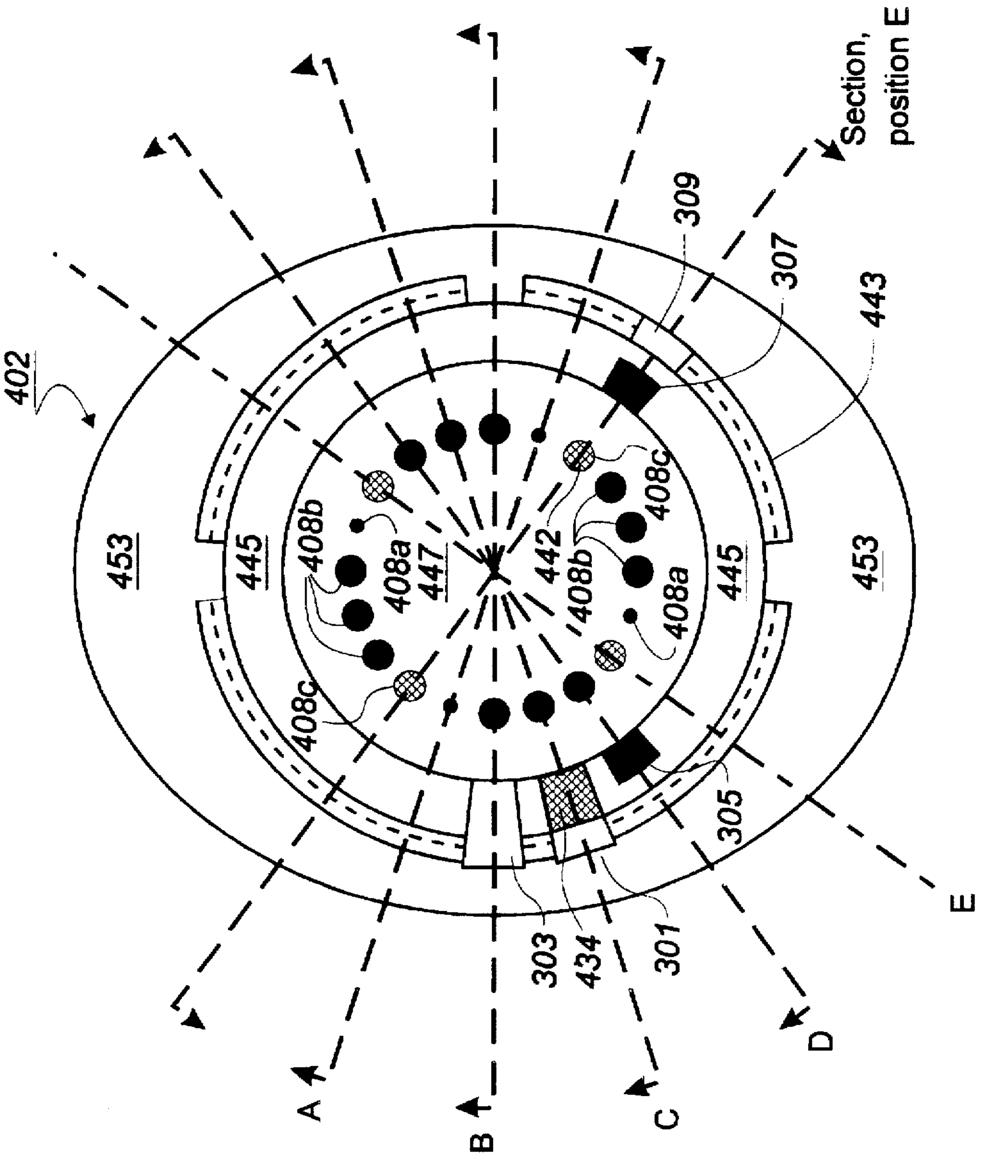
FIG. 3 is an illustration of a faceplate of the headset of FIGS. 4*a* through 4*e* and FIGS. 6*a* and 6*b*.
Figure 4A:
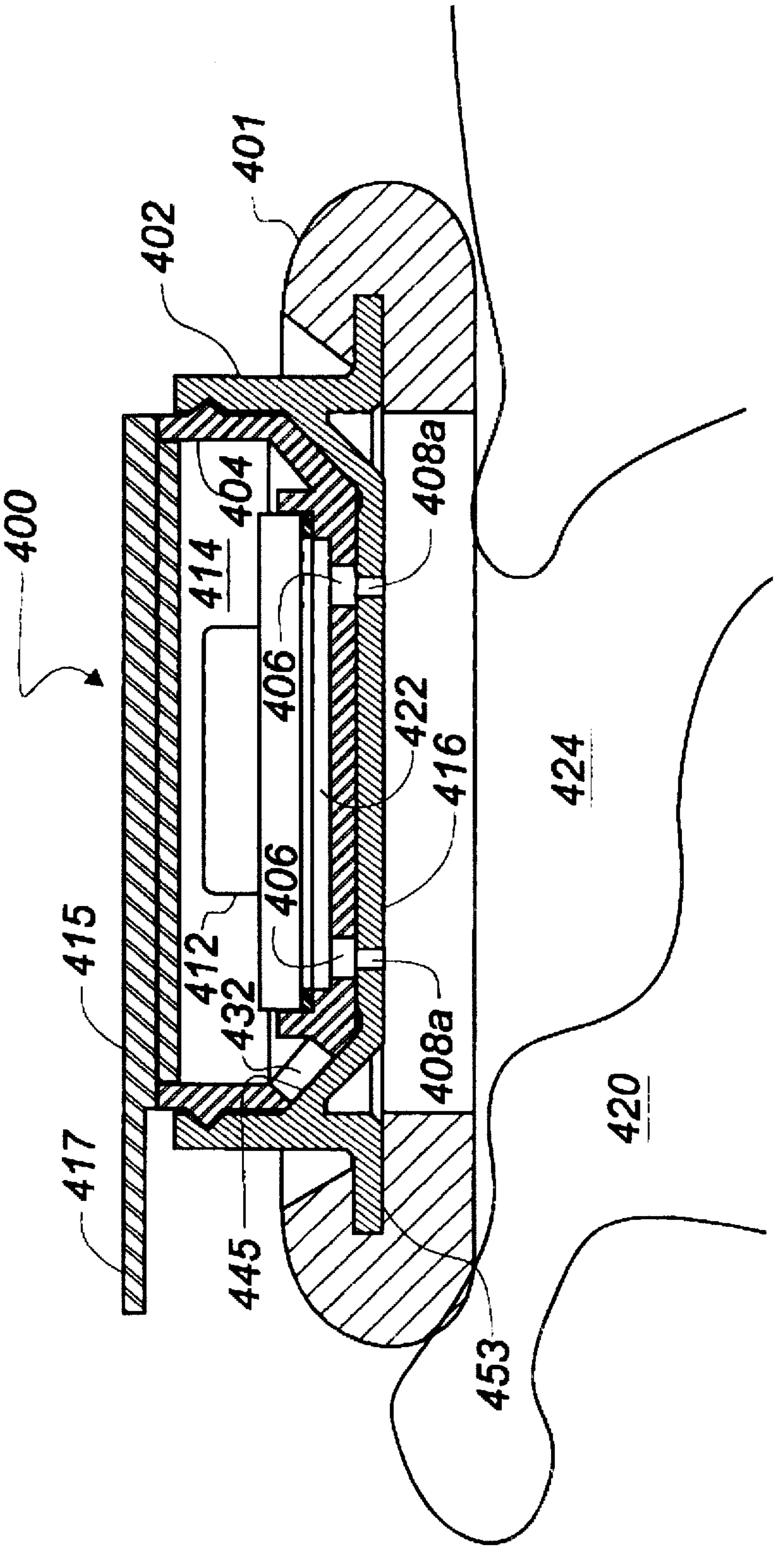
FIGS. 4*a* through 4*e* are cross-sectional views of the headset of FIGS. 6*a* and 6*b* in each of the positions shown in FIG. 3.

In FIG. 4*a* there is shown a cross sectional view of the headset 400 disposed on the surface of a human ear 420. This cross-sectional view corresponds to position A in the view of the faceplate 416 shown in FIG. 3. The front side of the inner cap 404 includes a number of openings 406; only two such openings 406 are shown in the cross sectional view of the figure. The outer cap 402 contains a number of openings 408*a*. As shown in FIG. 4*a*, the diameter of the openings 408*a* is less than the diameter of the openings 406. Aligning the opening 406 with an opening 408*a* of smaller diameter provides greater acoustic inductance and increased acoustic resistance in the transmission path between the interior volume 422 in front of the transducer 412 and the exterior volume 424 of the ear canal. This will tend to lower the resonant frequency of the interior volume 422, and reduce the high frequency response in the exterior volume 424.

Figure 4B:
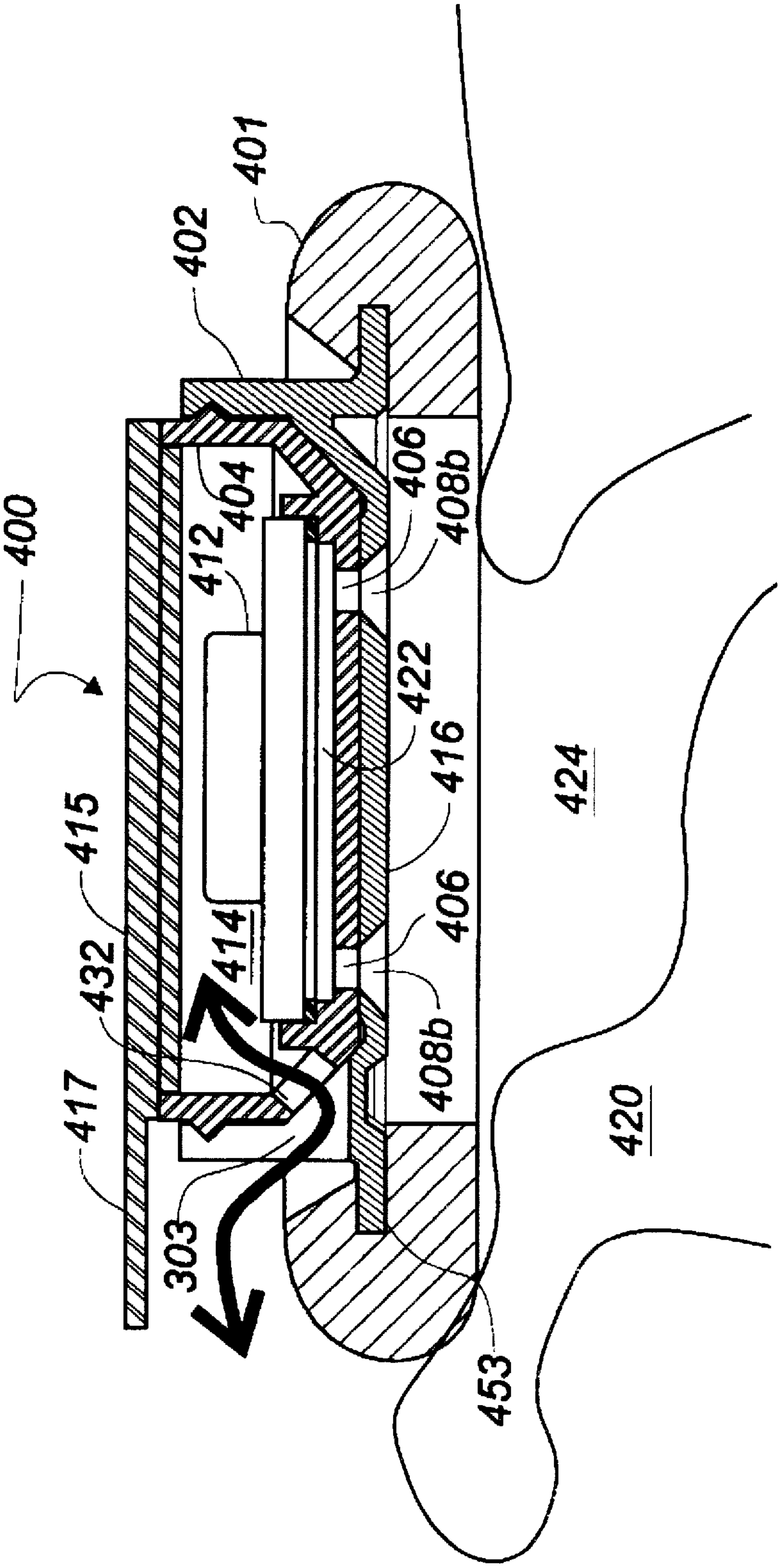

FIG. 4*b* illustrates the cross-sectional view of the headset 400 taken at position B in FIG. 3. Position B is achieved by rotation of the inner cap 404 with respect to the outer cap 402 by means of physical manipulation of the actuator 417 (not shown on FIG. 3). In FIG. 4*b* then, when in position B, the openings 408*b* of the outer cap 402 align with the openings 406 of the inner cap 404. These openings 408*b* have a larger diameter than the openings 406. In this position, there is less inductance and resistance in the transmission path, which extends the high frequency response. Position B is useful to the user to increase the audibility of high pitched audio signals. The exact frequency response in each of the positions A and B is determined by other factors, such as the inferior volume of the housing, any porting or leakage to the volume, and the like, which may be manipulated by the headset designer as desired, while still providing for the acoustic switching between two (or more) positions providing known frequency responses.

As shown in FIGS. 4*a* and 4*b*, the diameter of the openings 406 on the inner cap 404 are constant, and the diameters of the openings 408 on the outer cap 402 are varied to provided the desired acoustic response. In alternate embodiments, the varied openings may be placed in either, or both caps, to obtain a predetermined frequency response. FIGS. 3, 4*a*, and 4*b* will be further discussed below with respect to other type of adjustments provided in the present invention.

Figure 2A:
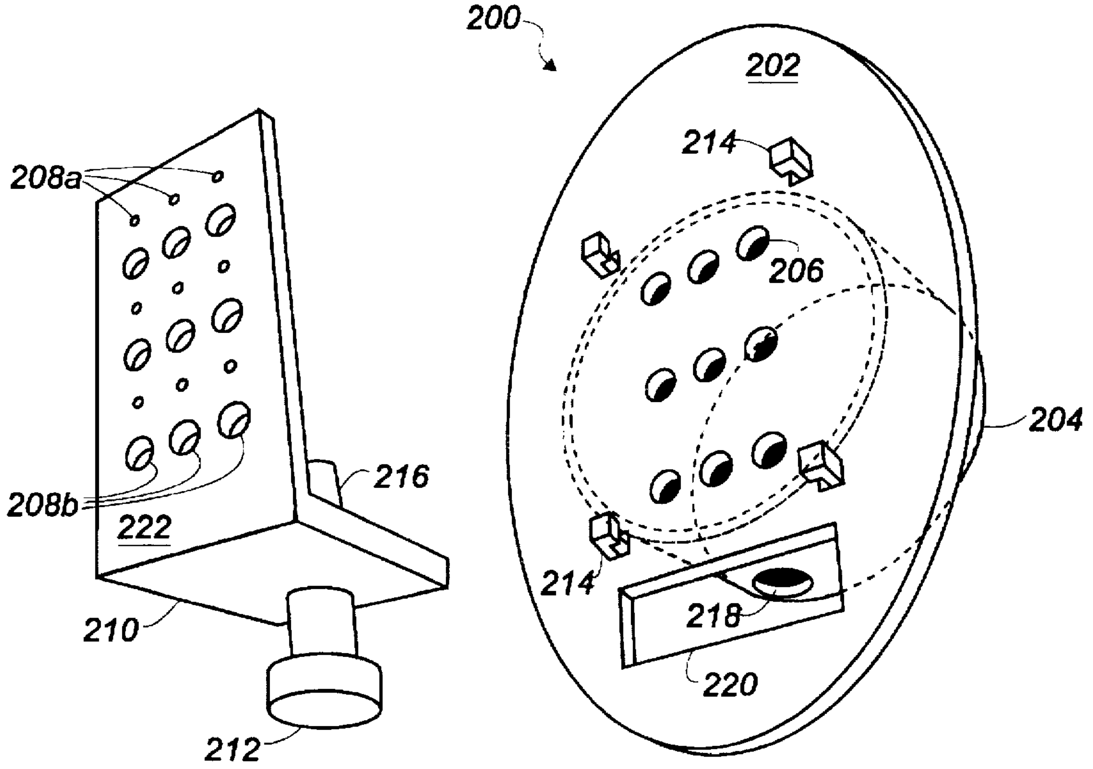
FIGS. 2*a* through 2*e* are illustrations of a headset with acoustic switching along the transmission path using a linearly slideable faceplate.
Figure 2B:
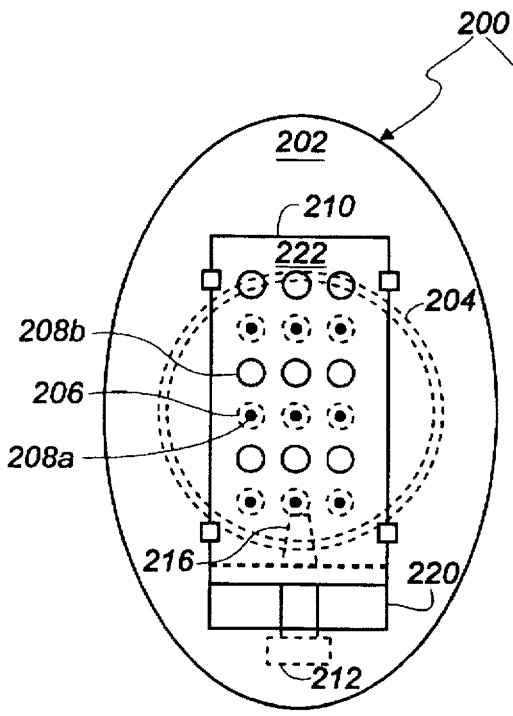
Figure 2C:
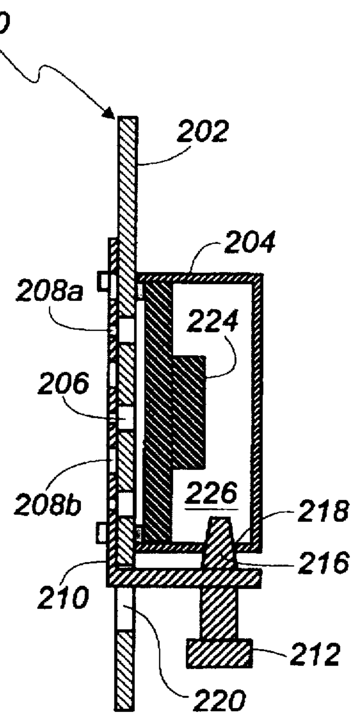

In FIGS. 1, 3, 4*a* and 4*b*, the adjustment of the transmission path was performed by rotational movement of one element with respect to another element. Alternatively, linear movement may be employed to achieve the same result. An example of such an alternate embodiment is illustrated in FIGS. 2*a*, 2*b*, and 2*c*. FIG. 2*a* shows a perspective, exploded view of a headset 200. A faceplate 202 is attached to and disposed in front of a housing 204 that contains the necessary transducer circuitry (not shown) for operation of the headset 200. The faceplate 202 includes a number of openings 206, here shown of a same diameter, in front of the housing 204. A slide 210 fits in front of the faceplate 202. The face 222 of the slide 210 contains a number of openings 208, with some openings 208*a* having a first diameter, and other openings 208*b*, having a second, greater diameter. The face 222 is maintained in contact with the surface of the faceplate 202 by a number of guides 214 that fit around the edges of the face 222. The face 222 is disposed through a slot 220 in the faceplate 202 so that the face 222 contacts the faceplate 202, while another portion of the slide 210 is disposed on the rear surface of the faceplate 202. An actuator 212 extends through the body of the slide 210 and forms a plug 216. The plug 216 is sized and formed to fit snugly into a hole 218 on the surface of the housing 204. The slide 210 can move vertically within the confines of the slot 220. In this embodiment, the slide 210 may be located in one of two positions with respect to the faceplate 202. These positions are illustrated in FIGS. 2*b* and 2*c*. In other embodiments, multiple positions of the slide 210 are possible.

Referring to FIG. 2*b*, there is shown a frontal view of the headset 200 showing the faceplate 202 with the slide 210 in a first position, and FIG. 2*c* is a cross sectional view thereof. The slide 210 is positioned such that the openings 208*a* of the slide 210 are aligned with the larger diameter openings 206 on the faceplate 202. The position is maintained by the plug 216 which snugly engages the hole 218 on the housing. The plug 216 seals the hole 218, and thus sealing the interior volume of the housing 204. The alignment of the smaller openings 208*a* results in the type of high frequency roll off described above. Note that the faceplate 202 is disposed such that the actuator 212 is on the bottom of the housing 204; this orientation makes it easier for the user to access and adjust the actuator 212 than if the actuator 212 were disposed on the top of the housing 204.

Figure 2D:
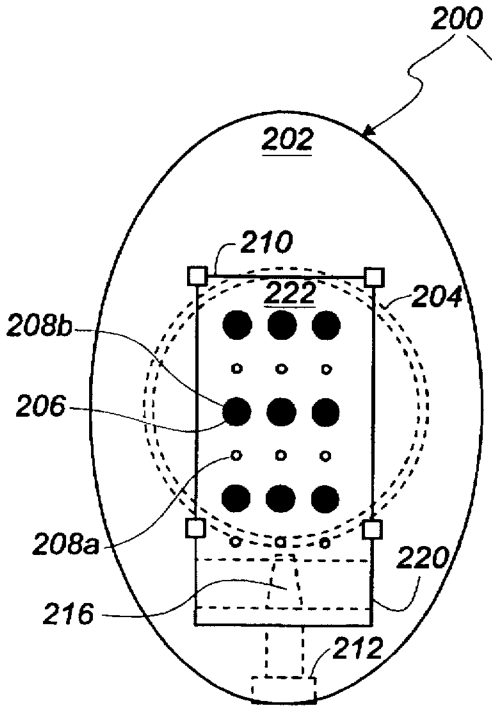
Figure 2E:
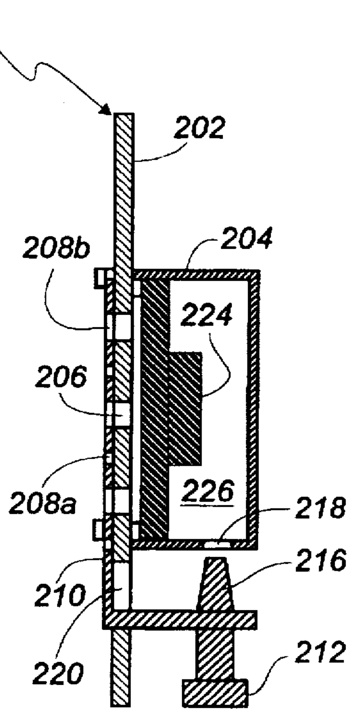

Referring to FIG. 2*d* now, there is shown a frontal view of the headset 200 with the slide 210 in a second position; FIG. 2*e* shows a cross-sectional view thereof. In this second position, the slide 210 is located such that the larger openings 208*b* are aligned with the similarly sized openings 206 of the faceplate 202. This position provides for the increased high frequency response as described above.

Figure 5B:
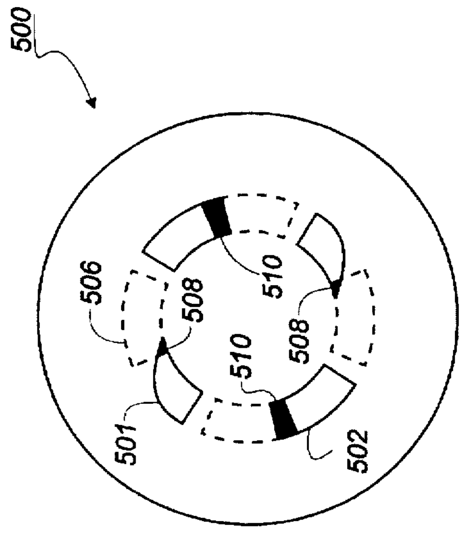
FIGS. 5*a* through 5*c* are illustrations of another headset with acoustic switching along the transmission path using a rotatable faceplate, having fixed and varying cross-sectional width openings.
Figure 5C:
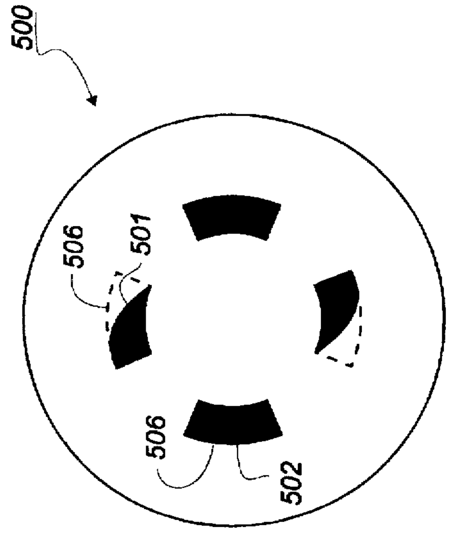
Figure 5A:
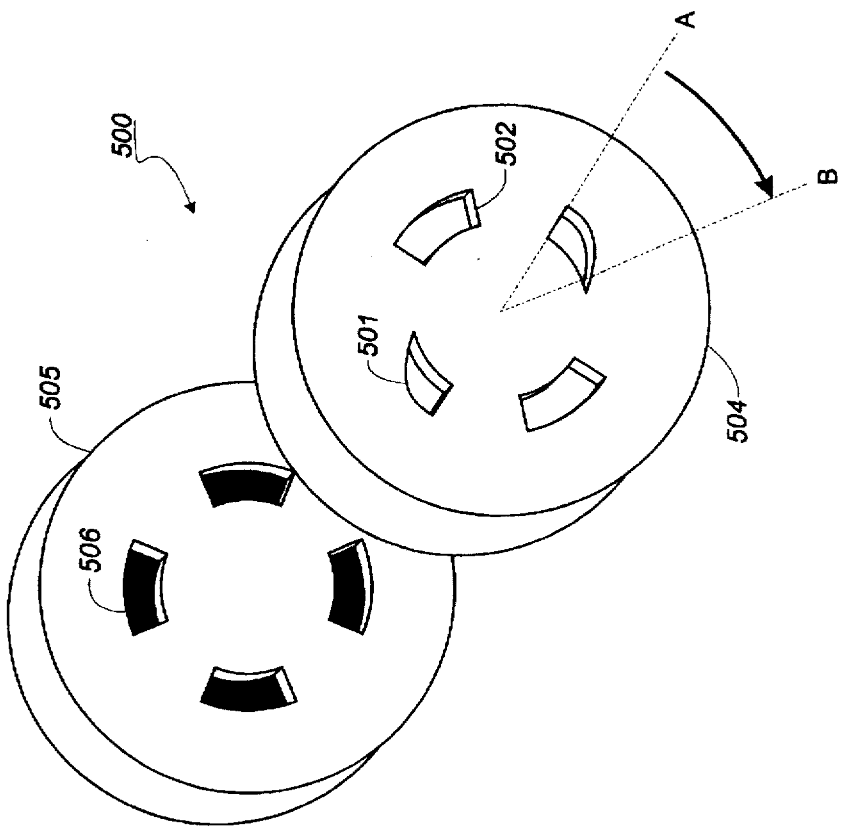

In addition to acoustic switching between discrete positions in order to adjust the transmission path characteristics, it is possible to provide a mechanism with continuous adjustment of the relationship between the acoustic elements of the headset, thereby presenting an entire ranges of frequency responses to the user, rather than selection of only two or so frequency responses. For example, FIGS. 5a–c illustrate a continuous adjustment mechanism for modifying the transmission path directly between the transducer and the ear canal. In FIG. 5a, a outer cap 504 includes either (or both) constant width slots 502, or variable width slots 501. The outer cap 504 is rotatably disposed on the inner cap 505. The inner cap 505 includes a number of constant width slots 506. The outer cap 504 may rotate to any position between an initial position A and a final position B. In any such position, the slots on the outer cap 504 will overlap the slots 506 on the inner cap 505. The area of the opening 508, 510 created by this overlap is determined by the relative position of the caps and the shapes of each opening 501, 502 and 506. Since the series inductance of the opening 508, 510 is inversely proportional to the area of the opening, these factors allow adjustment of that parameter over a defined range. The fixed width slots 502 provide a rate of change per degree of rotation that is very rapid when the opening 510 formed by the intersection with slots 506 is small, and declines as the size of the opening 510 increases. The variable width slot 501 distributes the change more uniformly over the full range of rotation. The contour of a variable width slot 501 can be chosen to provide any monotonic inductance adjustment rate desired up to the minimum inductance provided by complete exposure of the smallest opening. Either or both types of slots 501, 506 may be used in a headset. In alternate embodiments, the inner cap 505 may use configured to rotate with respect to a fixed outer cap 504. Also, the location of the constant 502 and variable width slots 510 may be on either cap, or both, and result in the same control effect.

Thus far, the manipulation of acoustic inductance and resistance by altering the cross-sectional area of short tubes or ports in the transmission path of the signal has been described. Inductance and resistance can also be adjusted by altering the length of the port.

Figure 7A:
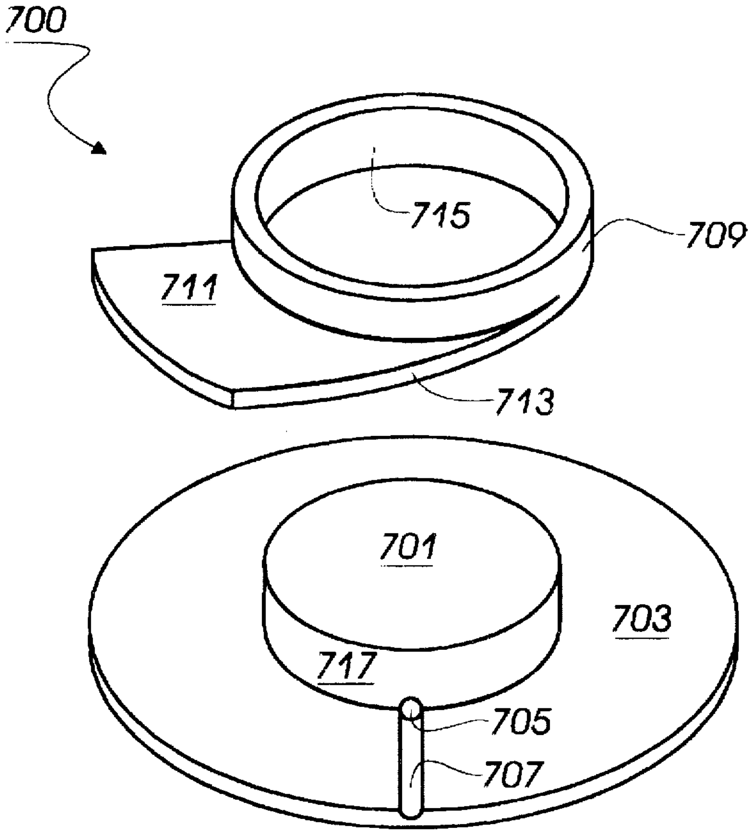
FIGS. 7*a* and 7*b* are illustrations of headset housing with variable inductance through adjustment of a port length.
Figure 7B:
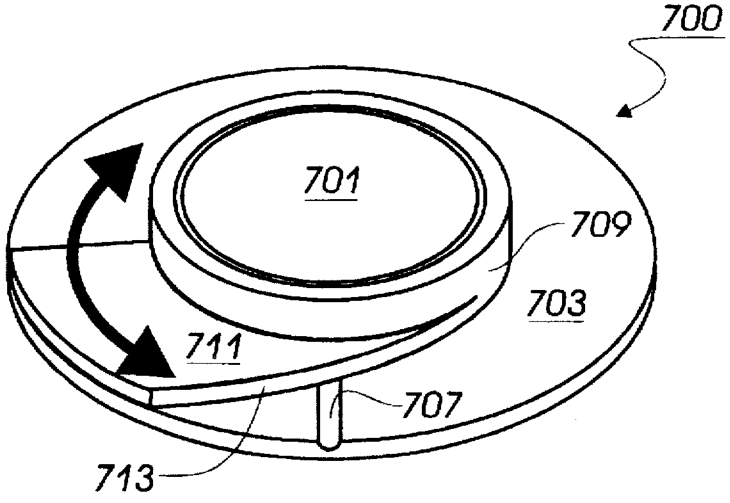

Referring now to FIG. 7a, there is shown an illustration of a portion of a headset 700 configuration providing for continuous adjustment of inductance through variation of port length. Here, the housing 701 includes the transducer (not shown) in an interior volume of predetermined size. The housing 701 is coupled to a faceplate 703, the backside of which is shown. At the junction of the housing 701 and the faceplate 703 is a port 705 that provides acoustic communication between the inferior volume of the housing 701 and the external free air. Extending from the port 705 to an edge of the faceplate 703 is a groove 707. In FIGS. 7a and 7b, the groove is shown having a constant cross section, though in alternate embodiment, the cross section may be varied. A control ring 709 is adapted to encompass the housing 701, and to rotate with respect to the housing 701. A vane 711 extends from the control ring 709 in the same plane as the faceplate 703. When the control ring 709 is mounted over the housing 701, an edge 713 and a portion of the bottom surface of the vane 711 cover a portion of the groove 707. This will extend the effective length of the port 705 along the length of the covered portion of the groove 707. The effective length of the port 705 determines the amount of inductance between the housing 701 and free air. Counterclockwise rotation of the ring 709 causes the vane 711 to incrementally cover the groove 707, thereby increasing the effective length of the port 705 and increasing inductance. Clockwise rotation uncovers the groove 707, and reduces its effective length and the effective inductance.

The edge 713 of the vane 711 has a predetermined curvature profile. The curvature profile of the edge 713 controls the rate of change of the port length and thus inductance. An edge 713 with constant curvature provides a constant rate of change. The amount of change per degree of rotation is also dependent on the angle between the edge 713 and the surface of the control ring 709. A low angle between the edge 713 and surface results in relatively small changes in effective length per degree of rotation, whereas an angle approaching 90° produces very rapid changes. In the preferred embodiment, the vane 711 has a predetermined number of positions that can be selected by the user during rotation of the control ring 709. The positions are chosen to provide a range of distinct frequency responses. The vane 711 can be fixed in the selected positions by a detent (not shown) along the interior wall 715 of the control ring 709 corresponding to each such position, the detent mating with a hub on the wall 717 of the housing 701 as the control ring 709 is rotated. Alternatively, the detents may be placed on the faceplate 703.

Finally, in any of the foregoing embodiments, screens, sintered elements, or other resistive materials may be incorporated into the openings, ports, or slots along the transmission path to shape the resistive characteristics thereof to a desired level, thereby further tuning the frequency response associated with the programmed element.

Adjustment of Housing Resonance

Generally, the low frequency response of a headset may be beneficially adjusted by the user without electronic filters by altering the resonant frequency and Q of the headset by controlling the acoustic volume, porting, and acoustic resistance of the enclosure containing the transducer.

Figures 6A, 6B:
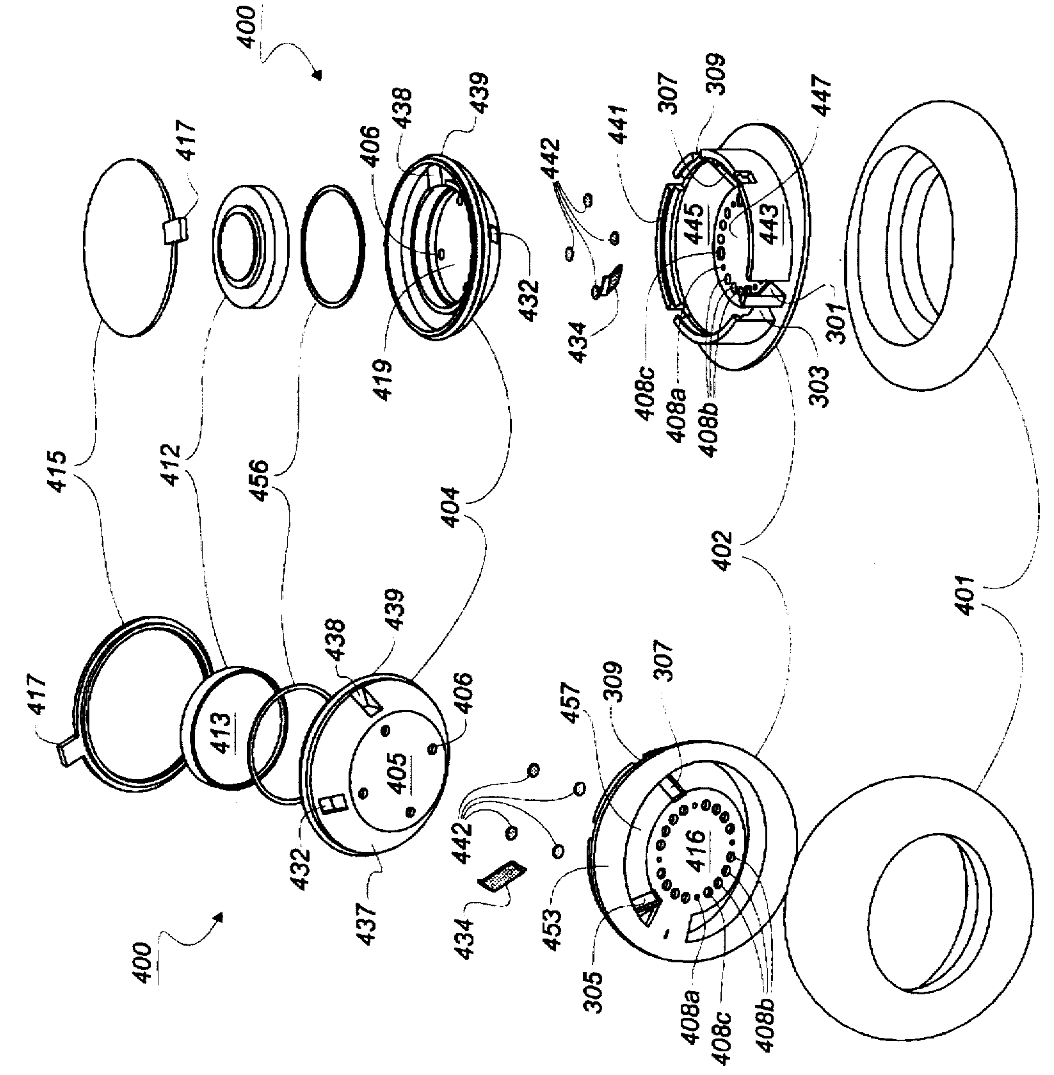
FIGS. 6*a* and 6*b* are exploded, perspective illustrations of a headset having acoustic switching of both transmission path and housing resonance characteristics.

FIGS. 6a and 6b illustrate two exploded, perspective views of one embodiment of a headset 400 providing a number of different configurations of porting variations for controlling housing resonance. FIG. 6a illustrates a perspective view of the front and exterior surfaces of the components of the headset, and FIG. 6b illustrates a perspective view of the back and interior surfaces of such components. FIGS. 4a through 4e illustrate cross-sectional views of the headset 400 of FIGS. 6a and 6b through the various components. FIG. 3 illustrates a back view of the faceplate 416 of the outer cap 402 shown in FIG. 6a. FIG. 3 also indicates the plane of cross section for each of the views in FIGS. 4a through 4e, each plane of cross section corresponding to a position A-E notated in FIG. 3. In FIG. 3, the faceplate 416 includes a number of ports that variably communicate with other acoustic elements as the actuator 417 (FIG. 6a) is rotated through its positions.

Referring then to FIGS. 6a and 6a, the headset 400 is comprised of an cover 415 which couples to an inner cap 404, thereby creating a back interior Volume (shown as 414 on FIGS. 4a–4e). The cover 415 includes a projecting tab actuator 417 which is manipulated by the user to rotate the cover 415 and attached inner cap 404 through a number of positions with respect to the outer cap 402.

Within the back interior volume 414 (FIGS. 4a–4e) between the cover 415 and the inner cap 404 is a transducer 412. A gasket 456 provides an acoustic seal between the volume 422 (FIGS. 4a–4e) in front of the transducer 412 and the back interior volume 414. The thickness of the gasket 456 and the height of the mounting ledge determine the size of the front volume 422. The front surface 405 of the inner cap 404 is parallel with the back surface 419, is circular, and includes a number of openings 406. The openings 406 are shown having a same diameter and shape, but the diameters may be varied, along with their shape, number, and location, as desired. Surrounding the front surface 405 is an angled bezel 437. Disposed at various locations on the bezel 437 is at least one port 432. The port 432 provides an acoustic pathway between the back interior volume 414 and other volumes, according the relative position of the inner cap 404 with respect to the outer cap 402. On this example embodiment, there is at least one notch 438 on the bezel 437. The notch 438 is a sealed indentation in the bezel 437, and so does not create an open pathway to the interior volume. FIG. 4e illustrates a cross sectional view of the headset 400 showing the notch 438. The inner cap 404 further has an extruded annular edge 439.

The front surface 405, bezel 437, and edge 439 couple to various elements on the interior surface of the outer cap 402. Edge 439 mates with annular V-groove 441 to fasten the outer cap 402 to the inner cap 404, and to constrain the movement of the inner cap 404 with respect to the outer cap 402 to rotation about a common axis. The interior of the outer cap 402 includes an angled wall 445 that corresponds to, and mates with, the bezel 437 of the inner cap 404. Similarly, the front surface 405 of the inner cap 404 mates with the interior surface 447 of the outer cap 402. The exterior surface of the outer cap 402 includes a faceplate 416. In the faceplate 416 are a number of openings 408 of various shape, size, and position. Various ones of the openings 408 are aligned with various ones of the openings 406 in each position that the inner cap 404 can take with respect to the outer cap 402.

The faceplate 416 is substantially surrounded by its own bezel 457 conforming to the exterior aspect of the angled wall 445. The faceplate 416 is further encircled by a flange 453. The flange 453 provides a surface on which the molded interior surface of the muff 401 attaches.

In the wall 445 of the outer cap 402 are at least one shallow slot 309 that provides an opening between the exterior and interior portions of the outer cap 402. Referring to FIG. 6b, there is shown in perspective view the interior side of the outer cap 402. A circular wall 443 extends away from the inner surface of the flange 453. Disposed at various positions on the wall 443 are cut-out ports which afford acoustic communication between various interior and exterior volumes. These are more fully described with respect to FIGS. 4a through 4f, as follows.

Figure 14:
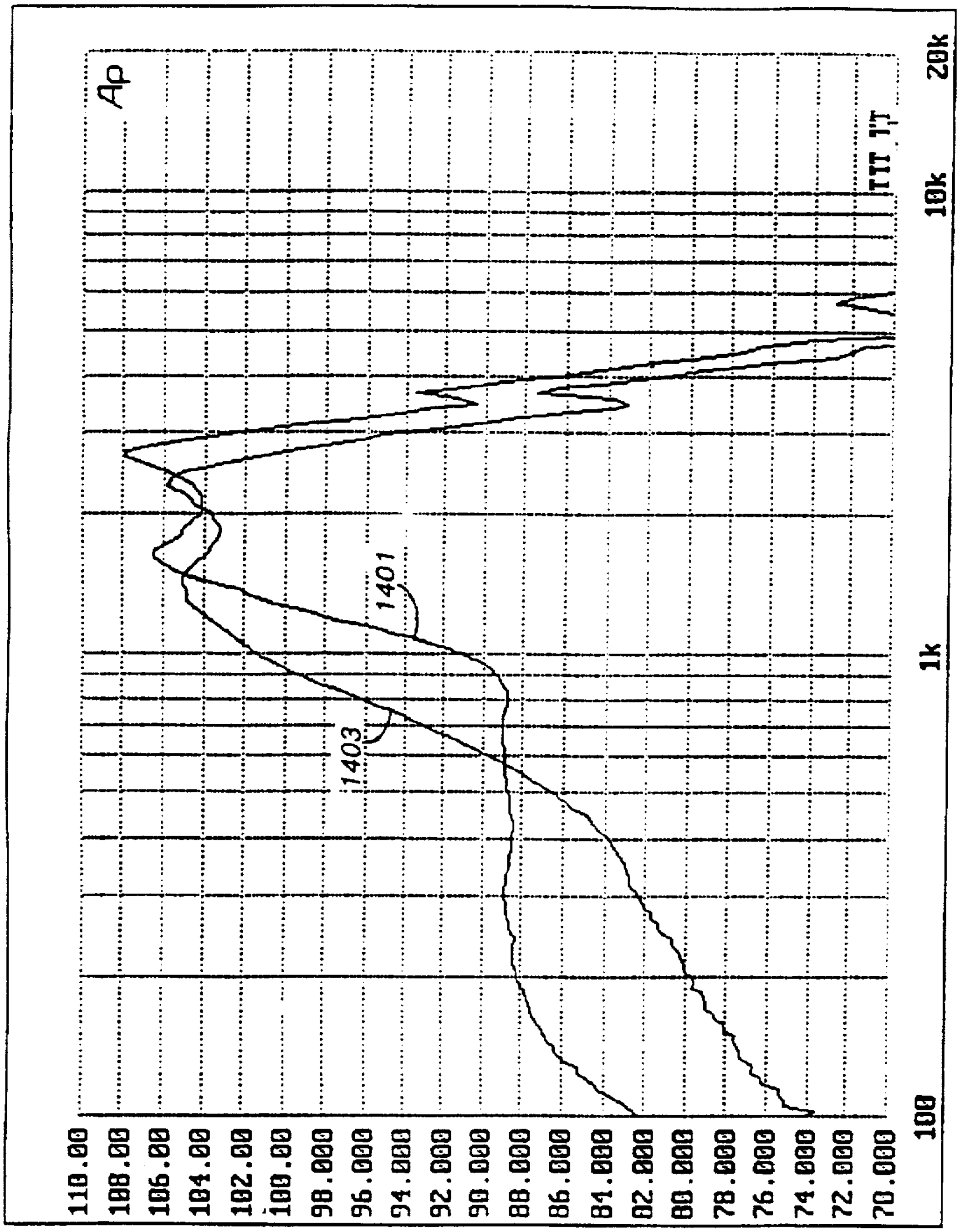
FIG. 14 is frequency response plot showing two frequency response curves corresponding to narrow and wide band responses.

In FIG. 4a there is shown a cross sectional view of the headset 400 disposed on the surface of a human ear 420. FIG. 4a illustrates the cross section taken at position A on FIG. 3. In this position, a port 432 on the bezel 437 of the inner cap 404 is aligned with a portion of the wall 445 of the outer cap 402. This position seals the port 432, and thereby the back interior volume 414. The low acoustic compliance of the sealed back interior volume 414 produces a higher resonant frequency for the transducer 412, resulting in reduced low frequency response and greater mid-band sensitivity. In addition, this low frequency shaping may be combined with high frequency roll-off as described above for FIG. 4a, where the small openings 408a are aligned with larger diameter openings 406 in the inner cap 404. Together, this configuration produces the equivalent of a narrow band acoustic circuit. FIG. 14 illustrates two frequency response curves for a headset having the above described configuration, as measured at eardrum position with an acoustic head and torso simulator. Curve 1403 is illustrative of the frequency response associated with FIG. 4a, in position A.

Referring now to FIG. 4b, in position B a free air slot 303 in the wall of the outer cap 402 is aligned with the port 432 to the back interior volume 414. This position allows communication of the free air volume 430 exterior to the headset 400 with the back interior volume 414. The increased compliance of ported back interior volume 414 provides for a lower resonsant frequency for the transducer 412, producing low frequency response. In addition, the opening may be sized in combination with the compliance of the back interior volume 414, to provide additional boost inoutput at a desired frequency. This frequency shaping may be likewise combined with an extended high frequency response, as described above for position B, by the aligning the openings 408b of the outer cap 402 in the faceplate 416 with the larger diameter openings 406 on the inner cap 404. This reduces resistance and inductance, and providing increased high frequency response. Overall, this position B produces a more natural sound than position A. Referring to FIG. 14, frequency response curve 1401 illustrates the wider band width response, corresponding to an equivalent flat free field response within the telephony band width.

Figure 4C:
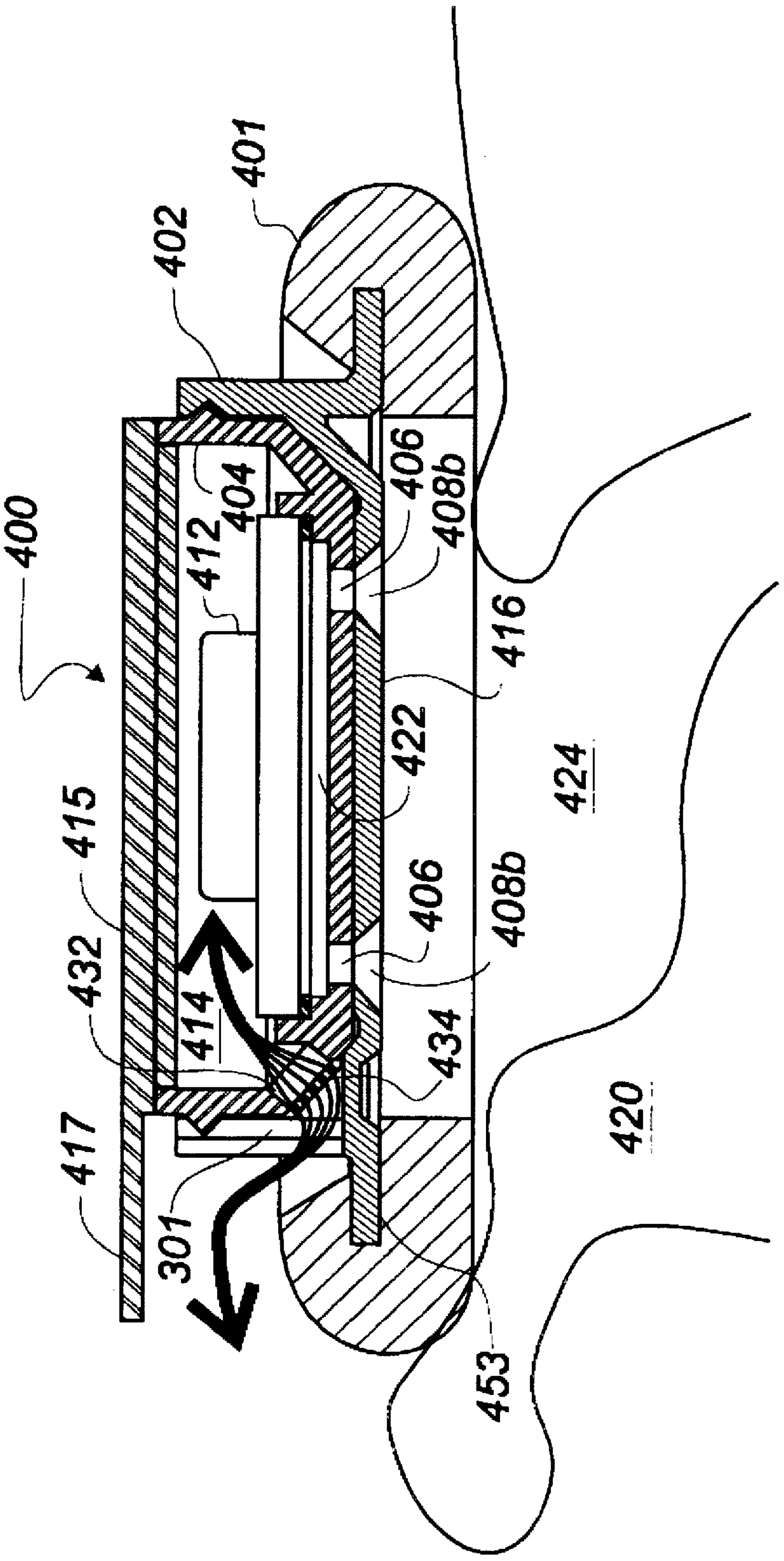

Referring now to FIG. 4c, in position C, another slot 301 on the outer cap 402 is aligned with a further port 432 on the inner cap 404, again, acoustically coupling the back interior volume 414 and the free air exterior volume 430. In this instance there is provided in slot 301 (or alternatively in the port 423) a molded acoustic resistance insert 434. The insert 434 may be chosen to provide a predetermined degree of resistance, thereby damping the resonant frequency of the transducer 412 to a desired Q. Again, the resulting low end frequency response may be combined, as illustrated in FIG. 4c, by aligning openings 408b with openings 406 as shown, to provide an increased high frequency response, or alternatively, by aligning openings 408a with openings 406 as shown in FIG. 4a, to provide a decreased high frequency response.

Figure 4D:
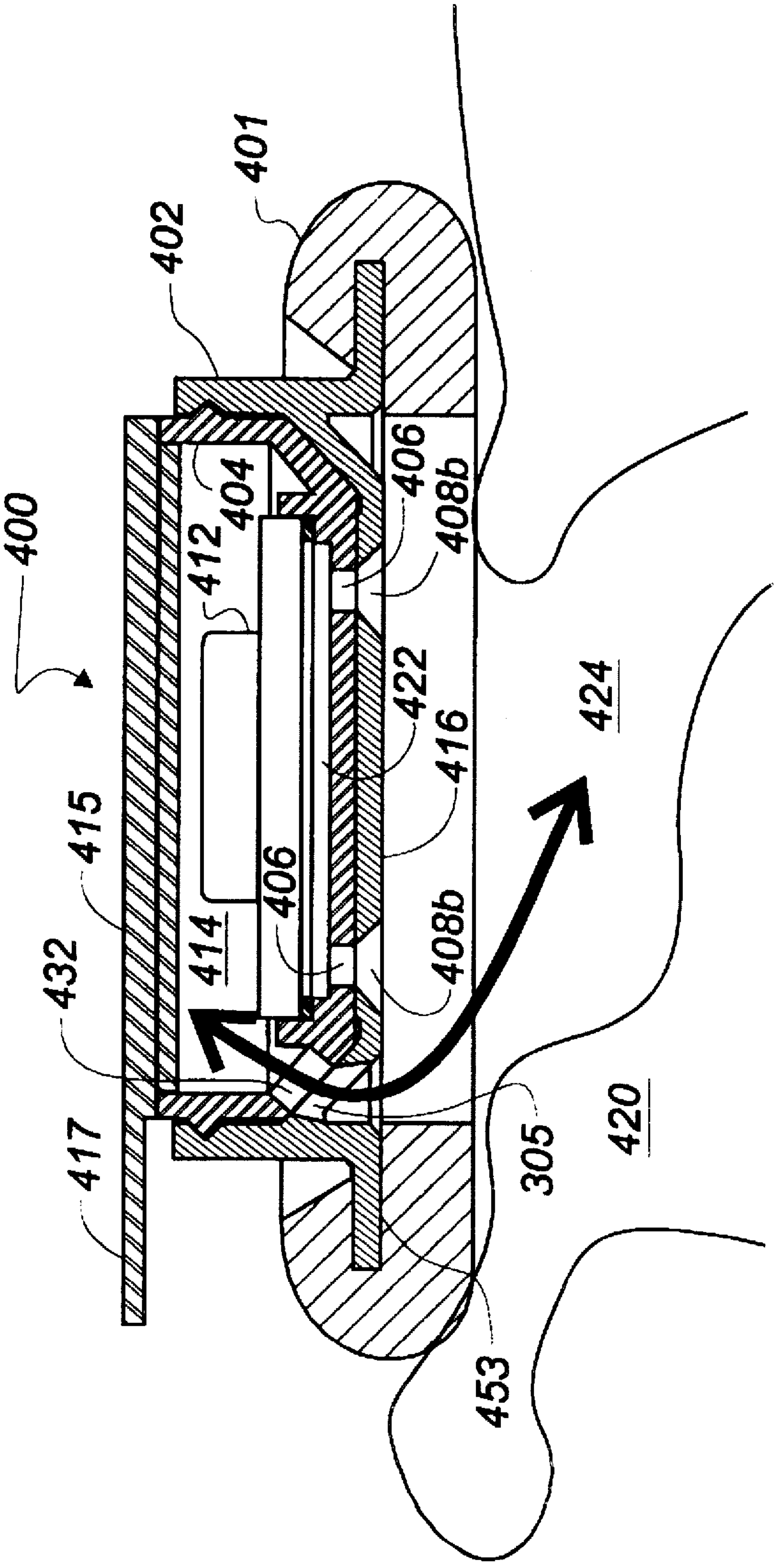
Figure 4E:
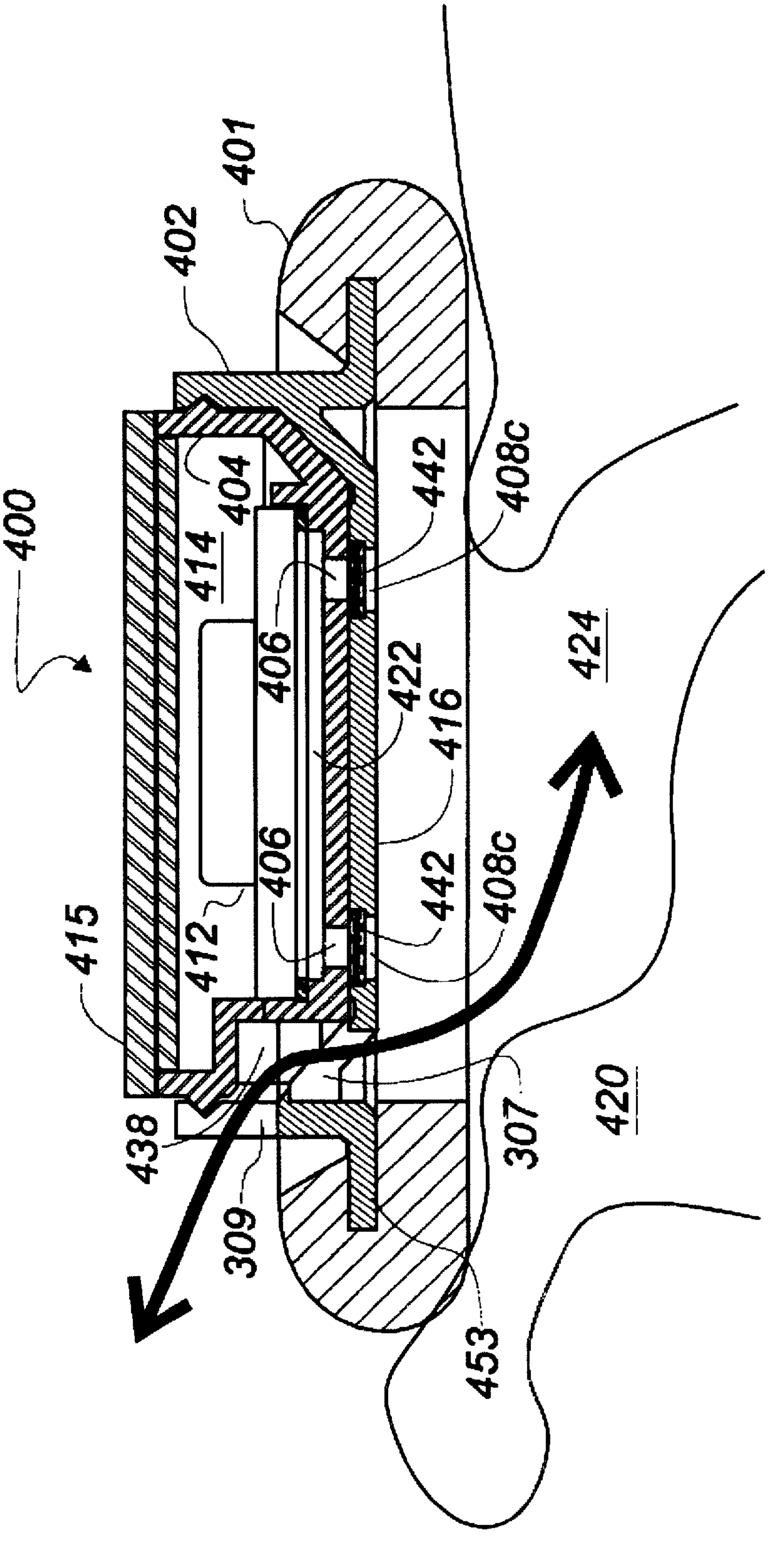

In position D, as illustrated in FIG. 4d, a port 305 in the angled wall 445 is aligned to acoustically communicate with the port 432 on the inner cap 404 to the back interior volume 414. In this position, there is controlled acoustic leakage between the back interior volume 414 and the exterior volume 424 of the ear canal. Proper selection of the dimensions of the port 432 can provide alterations in the slope of the low frequency response without the raising of transducer 412 resonance provided by sealing the back interior volume 414 (as in position A). Again, in this position D, the larger openings 408b align with the smaller openings 406 of the inner cap 404, increasing high frequency response.

Finally, the outer cap 402 may be rotated via the actuator 417 to position E. The cross section illustration for this position is shown in FIG. 4e, but is taken perpendicular to the axis defining position E shown in FIG. 3. In position E, a shallow slot 309 on the wall 443 of the outer cap 402 communicates with a passage formed by a notch 438 extending into but not communicating with the back interior volume 414 of the inner cap 404. The passage acoustically couples the slot 309 with a port 307 in the angeled wall 445 to the exterior volume 424 of the ear canal. In this position, acoustic leakage between the free air volume 430 of the headset 400 and the exterior volume 424 of the ear canal causes a decrease in low frequency energy from the ear canal. This produces a high-pass characteristic whose effects can be combined with other low frequency shaping to provide higher order attenuation. The effect of this leakage is carefully controlled by providing a muff 401 with a good seal around the ear canal (or whole ear in the case of circumaural headphones). In addition, in this position E, further programming of the frequency response is achieved by aligning the openings on the inner cap 404 and outer cap 402. As shown in FIG. 4*e*, openings 408*c* are aligned with openings 406 in the inner cap. Here openings 408*c* include an inserted acoustic resistance element 442, such as a screen, foam cell material, or the like. The larger openings 408*c* still provide wider frequency response but with a more gradual roll-off and greater damping of front cavity 422 resonance due to the resistance elements 442.

Figure 4F:
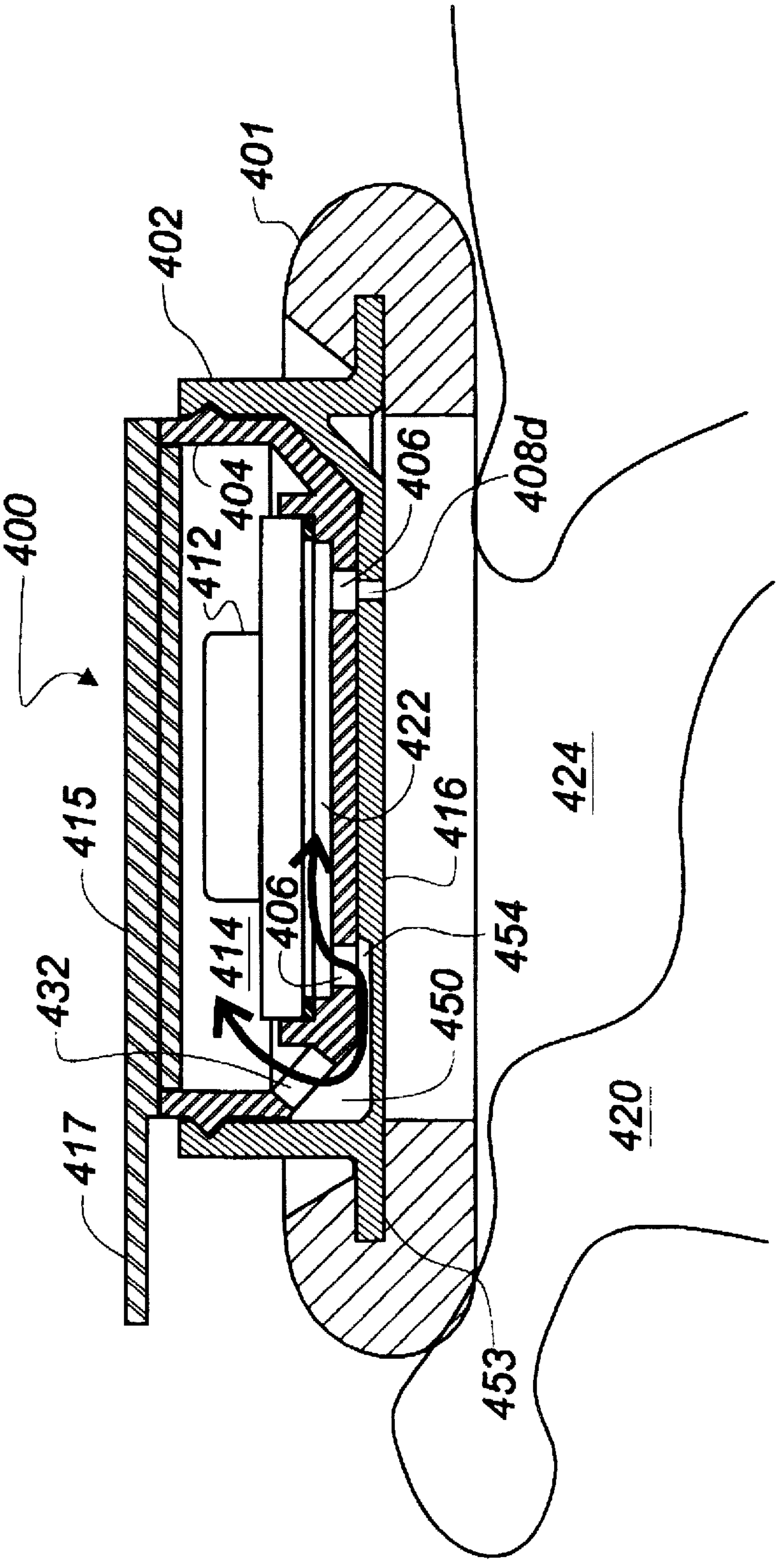
FIG. 4*f* illustrates a cross-sectional view of a headset of the same general construction as FIG. 6*a* and 6*b*, providing acoustic leakage within the headset housing.

Finally, referring to FIG. 4*f*, there is shown a cross-sectional view of the headset 400 providing controlled acoustic leakage between the back interior volume 414 and the cavity 422 between the back surface 419 of the inner cap 404 and the front surface 413 of the transducer 412. The headset 400 of this cross-sectional view is similar in configuration to the embodiment of FIG. 6*a* and 6*b*, but modified to provide the described acoustic leakage. Here, a port 432 on the inner cap 404 is aligned and communicates with a passage 450 in the backside of the faceplate 416. The passage 450 is formed as a groove or channel in the interior surface 447 of the outer cap 402. The passage 450 terminates at an opening 454 which is aligned in this position to communicate with an opening 406 on the inner cap 404. In this position then, the back interior volume 414 is acoustically coupled with the cavity 422. This has an action similar to that of position D but with different effects on the mid and high frequencies. The magnitude of the effects and the frequencies at which they operate is determined by the specific geometry of the ports.

In each of the foregoing illustrations, the acoustic leakage implementations that couple ports and slots between the back interior volume 414, exterior volume 424 of the ear canal, and free air exterior volume 430 may be used independently of, or with, any of the transmission path modifications through manipulations of openings in the inner cap 404 and angeled wall 445. They have been illustrated together to show the ability to shape the overall frequency response associated with each position. In addition, the number of positions described here need not all be employed in a headset 400, but rather selected ones may be used as desired to provide the desired choices of frequency response options to a user. Finally, it should be noted that in these examples, the size of opening on the inner cap 404 is constant while the size of the openings on the outer cap 402 provide the varied structural characteristic to alter the frequency response. However, in principle the programmed elements can be placed in either location.

Also in the foregoing examples, the acoustic inductance of the headset 400 may be controlled by varying the cross-sectional area and length of the ports. Also, the acoustic resistance may be varied independently of acoustic inductance. Acoustic resistance is used to provide controlled damping for cavity and diaphragm resonance, acoustic attenuation, as well as low-pass filtering when used with a shunt acoustic compliance. Acoustic resistance may be increased by replacing an single opening, with group of openings with approximately the same total cross sectional area. For example, in FIGS. 4*a*–*f*, the port 432 may be replaced by a number of smaller ports meeting the above criteria. Likewise, FIG. 4*e* illustrates the use of a resistive element 442 to alter the acoustic resistance through opening 408*c* without altering inductance.

Figure 13B:
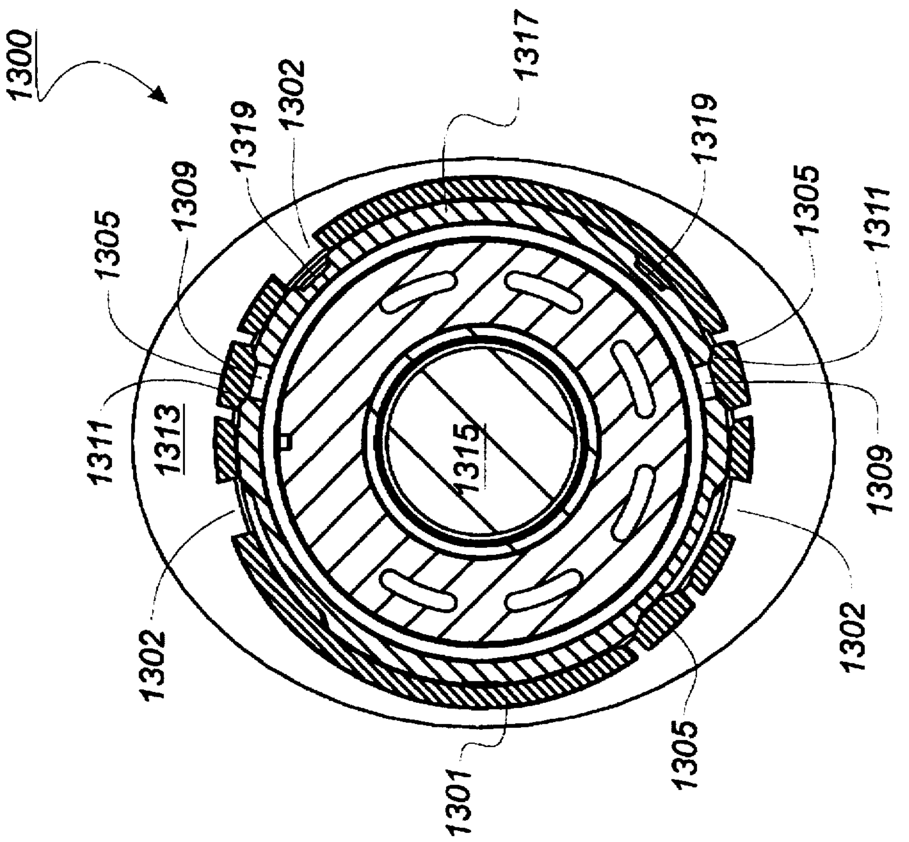
FIGS. 13*a* through 13*d* are illustrations of a headset including spherical seals.
Figure 13A:
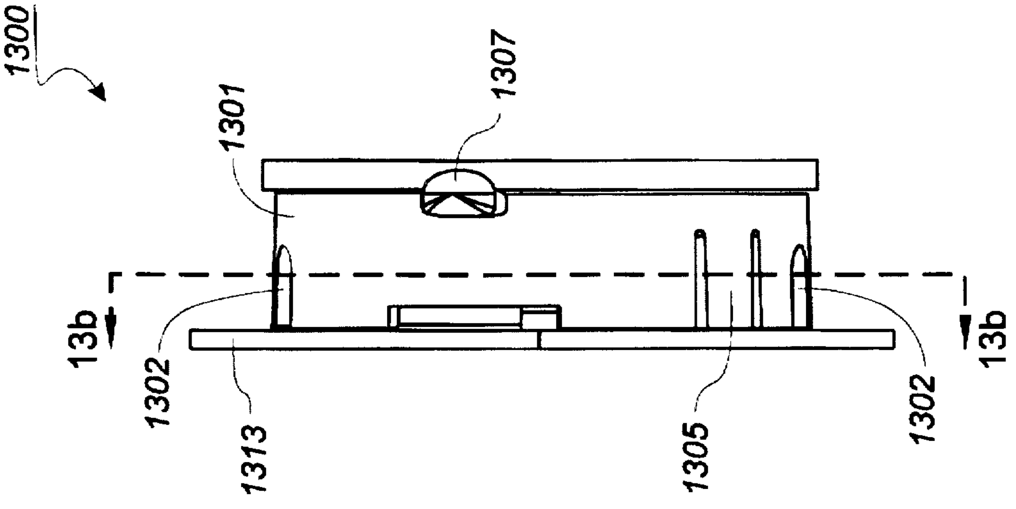

In order to produce accurately controlled frequency responses between various configurations of the headset, a proper seal of the various volumes, ports, and the like is needed. In one preferred embodiment spherical seals are used with cylindrical ports. FIGS. 13*a* through 13*d* illustrate the use of spherical seals. In FIG. 13*a*, there is shown a elevational view of a headset 1300. The headset 1300 includes a faceplate 1313 coupled to a housing 1317 (FIG. 13*b*). Rotatably disposed around the housing 1317 is a control ring 1301. The control ring 1301 has an actuator tab 1307 extending perpendicularly to the surface of the ring. The tab 1307 allows the user to rotate the control ring 1301 with respect to the housing 1317. The surface of the control ring 1301 has a number of seal cantilevers 1305, and notches 1302. Referring to FIG. 13*b*, there is shown a cross-sectional view of the headset 1300 in FIG. 13*a*. On the interior portion of each seal cantilever 1305 there is a disposed as spherical seal 1311. The protusion of the spherical seal 1311 causes the seal cantilever to exert a sealing force against the wall of the housing 1317. Variously disposed along the wall of the housing 1317 are ports 1309. The ports 1309 as formed as cylindrical holes, having a circular cross-section. In FIGS. 13*a* and 13*b*, the control ring 1301 is positioned with respect to the housing 1317 such that the spherical seals 1311 substantially align with selected ports 1309. The sealing force caused by the seal cantilevers substantially centers the spherical seal 1311 in the port 1309. This seals an interior volume of the headset 1300. The spherical seals 1311 provide a positive seal with the ports 1309 because the intersection of a sphere and the end of a cylinder is always a circle. This automatically compensates for angular or positional misalignment of the spherical seal 1311 and the port 1309, and for variations in the sizing of the spherical seal 1311 or port 1309 during manufacturing.

Figure 13D:
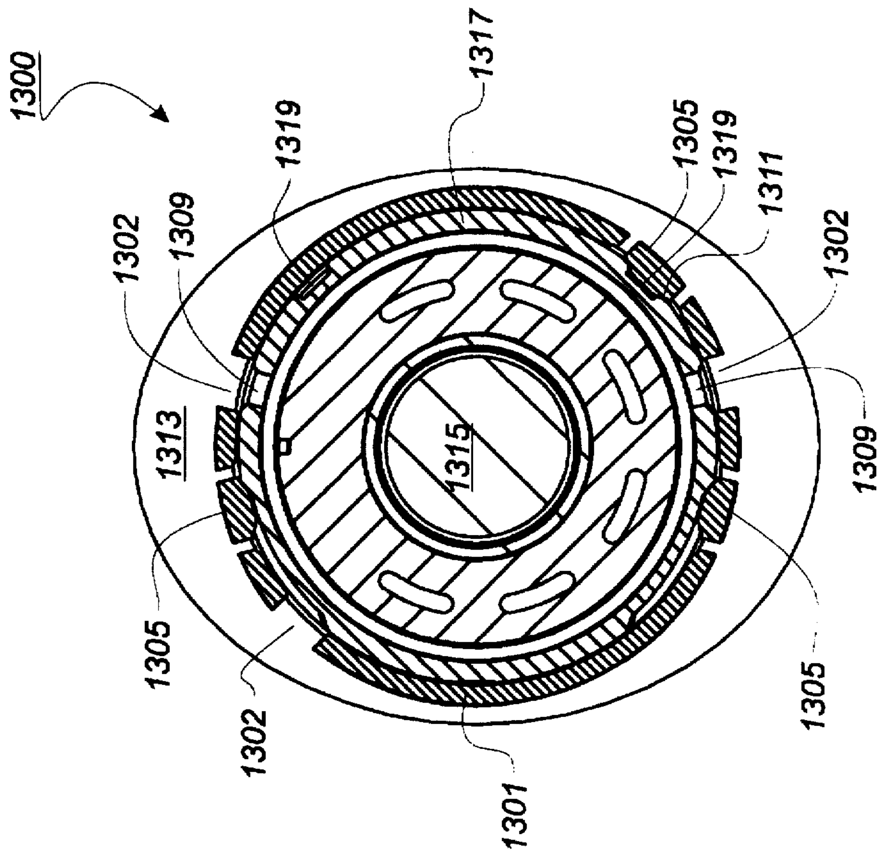
Figure 13C:
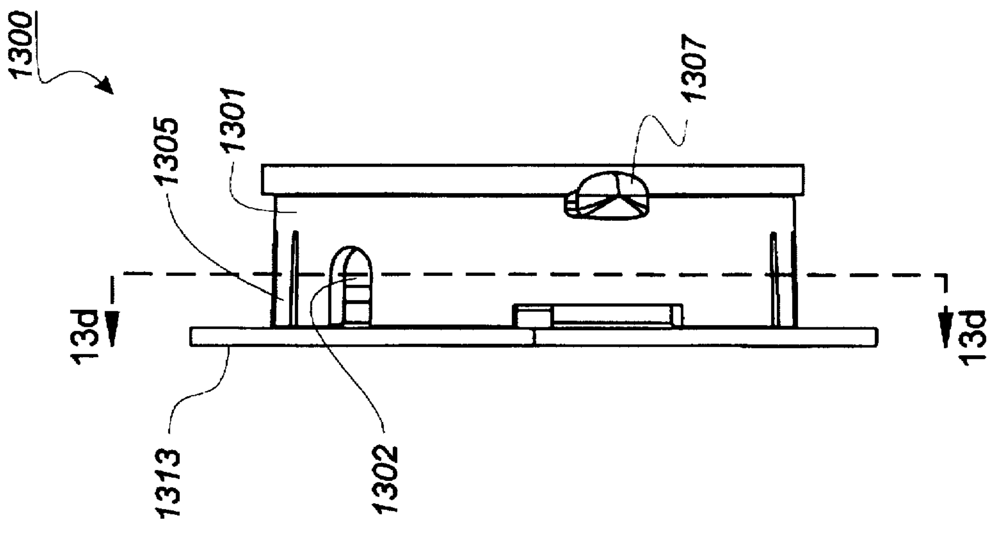

In FIG. 13*c*, there is shown the headset 1300 with the control ring 1301 positioned so that the notches 1302 align with the ports 1309, thereby porting the interior volume of the headset 1300. FIG. 13*d* illustrates a cross-sectional view of this position. Here, the seal cantilevers 1305 align with detents 1319 in the wall of the housing 1317 to stably maintain the control ring 1301 in this position, while the notches 1302 align with the ports 1309.

The use of acoustic leakage to control low frequency response is also illustrated in FIGS. 2*b* and 2*c*. In FIG. 2*c*, the plug 216 is disengaged from the hole 218, thereby venting the interior volume 226 to the free air surrounding the housing 204. This extends the low frequency response of the headset. When used in conjunction with the increased high frequency response resulting from the alignment of the larger openings 208*b* in the slide 210 with the smaller openings 206 in the faceplate 202, the overall frequency response of the headset 200 produces a more "natural" sound, as compared to the attenuated frequency response associated with the first position described above.

Figure 11A:
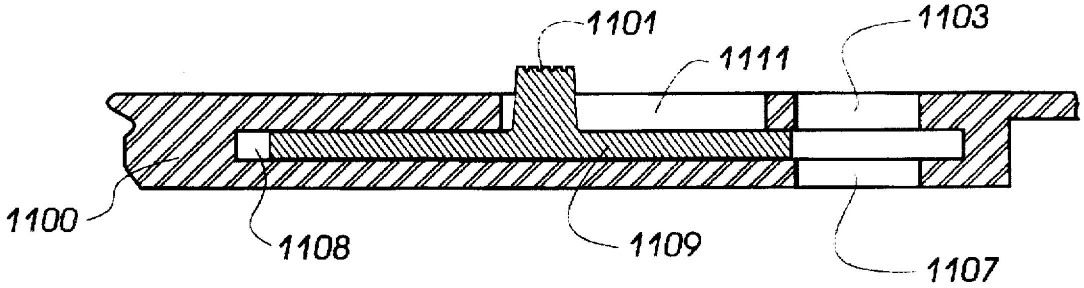
FIGS. 11*a* and 11*b* are illustrations of an ear-bud style headset housing with acoustic switching of ports.
Figure 11B:
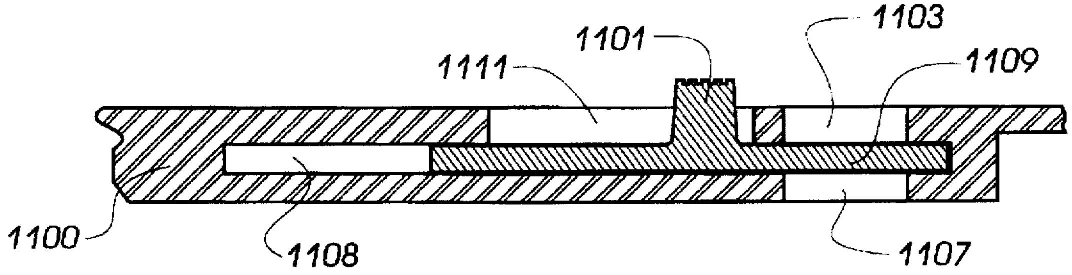

The foregoing embodiments of the acoustic switching methods the present invention have been shown as applied to supra-aural headset designs. The acoustic switching methods may also be used with other types of headsets. Referring now to FIGS. 11*a* through 11*b*, there is shown cross sectional view of one embodiment of acoustic switching in an ear bud style headset. Only the back wall of the volume behind the transducer is shown, with what would be the top of the headset 1100 to the right. The headset 1100 is shown in a horizontal position, with the top of the headset 1100 on the right. The headset 1100 includes a transducer (not that would be disposed toward the ear of the user. Opposite the backside of the transducer 1105 is a port 1103. Lying bet-ween the transducer 1105 and the port is a passage 1107. A sliding gate 1109 is disposed within a slot 1108 in the body of the headset 1100. The gate 1109 has an actuator 1101 that extends outwardly through a slot 1111 in the outside surface of the headset 1100. The actuator 1101 is manipulated by the user to slide the gate 1109 within the confines of the slot 1111. In the position shown in FIG. 11*a*, the gate 1109 is disposed as to leave the passage 1107 between the port 1103 and transducer 1105 open. This position provides an extended low frequency response for the headset 1100. FIG. **11*b* illustrates the actuator 1101 moved to the top of the slot, thereby closing the passage 1107 with the body of the gate 1109**. In this position, low frequency response is attenuated.

The compliance of the headset transducer may also be adjusted to alter its resonant frequency without porting, but rather through directly increasing or decreasing the size of the housing itself. Changes in the volume of the housing may be accomplished through pistons, bellows, displacements, or switched volumes.

Figure 8B:
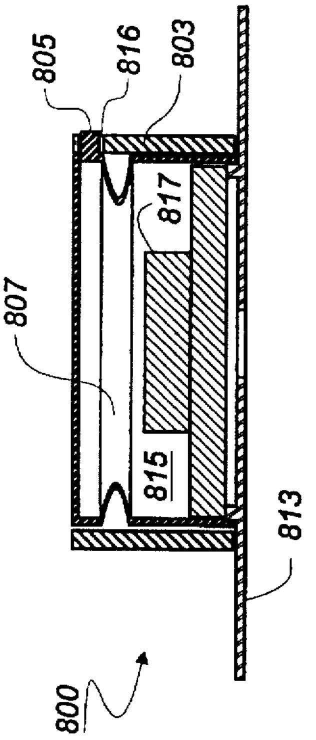
FIGS. 8*a* through 8*c* are illustrations of a headset housing with adjustable volume using bellows.

Referring now to FIG. **8*a*, there is shown a perspective, exploded view of one embodiment of housing with a variably sized interior volume using bellows. The headset 800 includes a external cam ring 803, an inner housing 801, and a faceplate 813. The housing 801 contains a transducer 817 in a sealed interior volume 815 (FIG. 8*b*). The housing 801 comprises a lower section 806, a bellows 807, and a top cap 804. The lower section 806 contains the transducer 817, and mounts onto the backside of the faceplate 813, providing a seal against a ring 812 disposed thereon. The bellows 807 are a flexible solid membrane, and couple between a top edge of the lower section 806, and a bottom side of the top cap 804. The volume between the top cap 804 and the lower section 806 is continuous. Along the edge of the top cap 804 are a number of cam followers 805**.

The cam ring 803 surrounds the inner housing 801 and contains a number of cam profiles 811. The cam profiles 811 have a maximum open position 816, and a maximum closed position 819. The cam followers 805 fit within the cam profiles 811. The cam ring 803 also has a actuator tab 809 that the user manipulates to rotate the cam ring 803 with respect to the housing 801. Rotation of the cam ring 803 alters the size of the interior volume as follows.

Figure 8C:
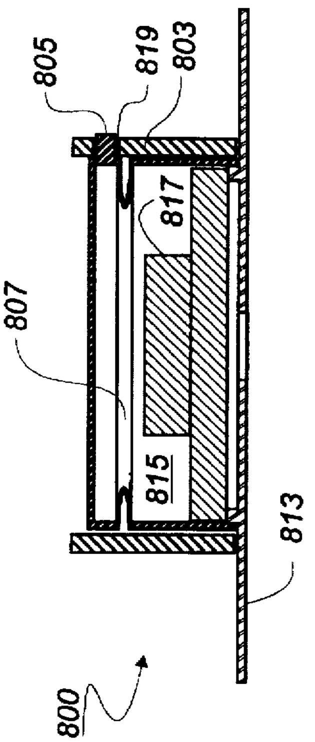
Figure 8A:
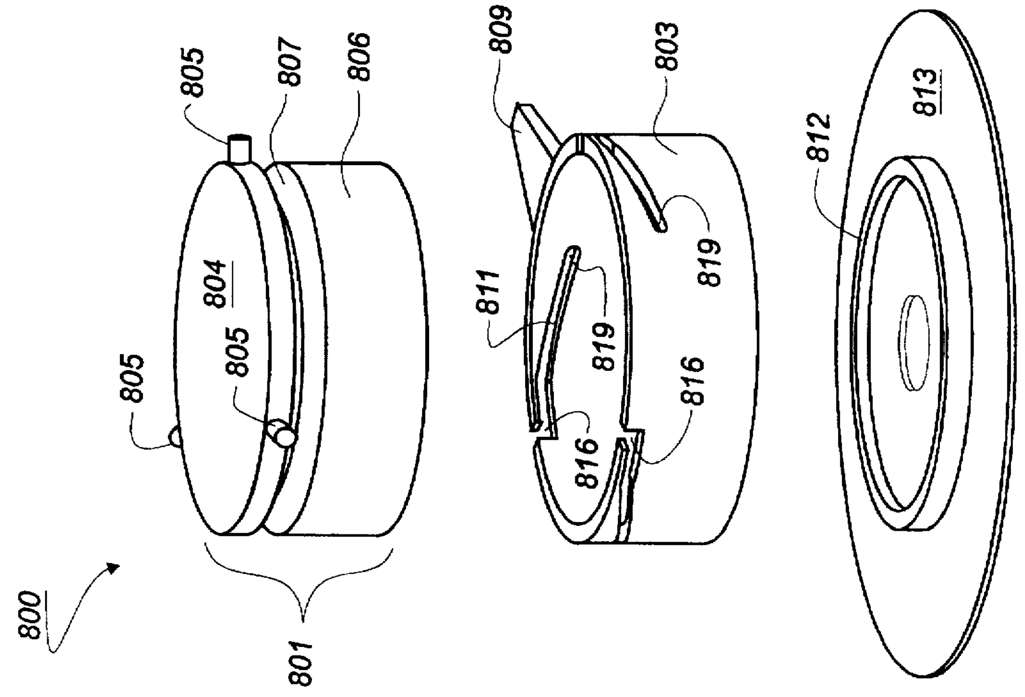

In FIG. **8*b*, there is shown a cross section view of headset 800 with the cam followers 805 at the maximum open position 816 on the cam profiles 811. In this position the bellows 807 is fully extended, increasing the size of the interior volume 815 behind the transducer 817. This position increases the compliance of a diaphragm of the transducer 817, lowering the resonant frequency of the headset 800, and extending the low frequency response. Counter-clockwise rotation of the cam ring 803 causes the cam followers 805 to traverse their respective cam profiles 811. This causes the top cap 804 to lower and the bellows 807 to collapse. FIG. 8*c* shows a cross section of the headset 800 with the cam followers 805 at the maximum closed positions 819 of the cam profiles 811. This position decreases the interior volume of the housing 801**, reduces compliance, and reduces low frequency response.

Figure 9B:
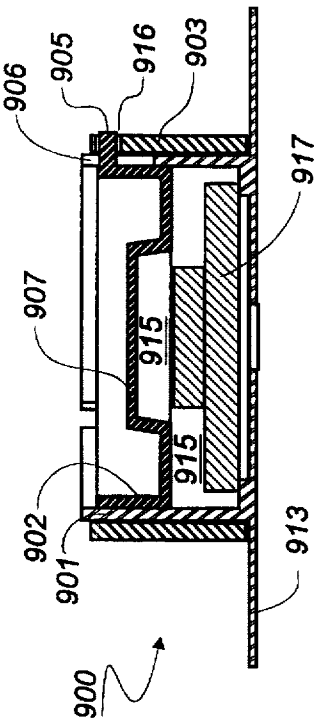
FIGS. 9*a* through 9*c* are illustrations of a headset housing with adjustable volume using a piston.
Figure 9C:
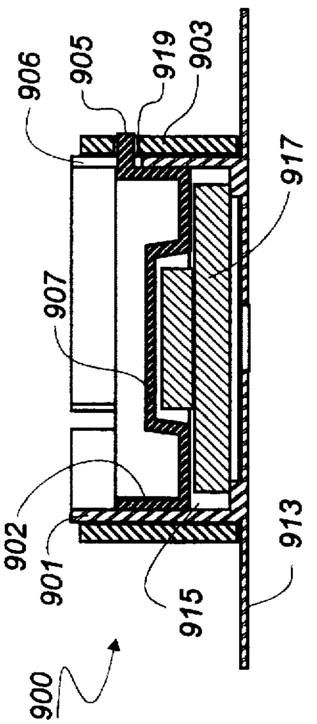
Figure 9A:
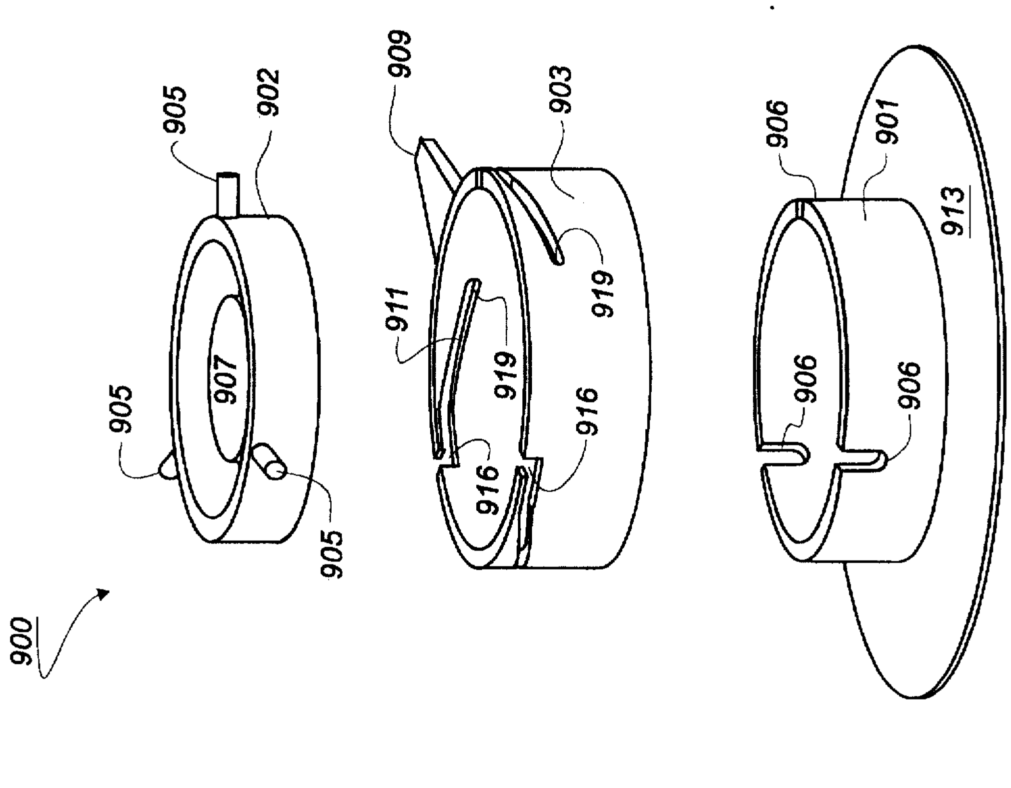

Referring now to FIGS. **9*a* through 9*c*, there is shown another embodiment of a housing with variable volume, here using a piston to adjust volume. In FIG. 9*a* there is shown an exploded perspective view of the headset 900. The headset 900 comprises a housing 901, a faceplate 918 coupled thereto, a cam ring 903, and a piston 902. The cam ring 903 surrounds the housing 901, as described above, and has cam profiles 911, also as described. An actuator tab 909 extends aways from the cam ring 903, and allows the user to rotate the cam ring 908 with respect to the housing 901. The piston 902 fits within the cam ring 903, and seals the top of the housing 901, providing a sealed interior volume 918. The piston 902 has a number of cam followers 905 which fit info the cam profiles 911. Since the piston 902 is not solidly connected to the housing 901, it is held fixed with respect to the housing 902 by cam slots 906. The cam slots 906 allow the cam followers 905 to raise and lower as the cam ring 913 is rotated, and the cam followers 905 traverses the cam profiles 911**.

Referring now to FIG. **9*b*, there is shown the headset 900 with the cam followers 905 of the piston 902 at the maximum open position 916 of the cam profiles 911. Here, the piston 902 is raised above the transducer 917, and provides a large interior volume 915. Again, this position produces a maximum compliance, and minimum stiffness for transducer, and thus a lower resonant frequency, and extended low frequency response. The open volume is formed by a raised piston roof 907 in the middle of the piston 902. The piston roof 907, in this embodiment, has approximately the same contour as the outside surface of the transducer 917. As the cam ring 903 is rotated, and the cam followers 905 traverse the cam profiles 911 to the maximum closed position 919, the piston 902 is lowered. The contour of the piston roof 907 allows it to very closely approach the transducer 917. This considerably reduces the size of the interior volume 915. This position is shown in FIG. 9*c***.

Referring now to FIG. **10*a*, there is shown another embodiment of a headset with variable size interior volume, here using switched volumes. Here, the headset 1000 includes an inner housing 1003 rotatably mounted in an outer housing 1001. The inner housing 1003 has an interior volume 1002 surrounding a transducer 1005. On the side of the inner housing 1003 is a port 1007 to the interior volume 1002. The inner housing 1003 is substantially circular and fits in a circular opening 1004 in the outer housing 1001. An actuator tab 1014 extends from the inner housing 1003, allowing the user to rotate the inner housing 1003 with respect to the outer housing 1001. The outer housing 1001 contains a larger second interior volume 1011. On the wall of the circular opening 1004 is a port 1009 to the interior volume 1011**.

Figure 10A:
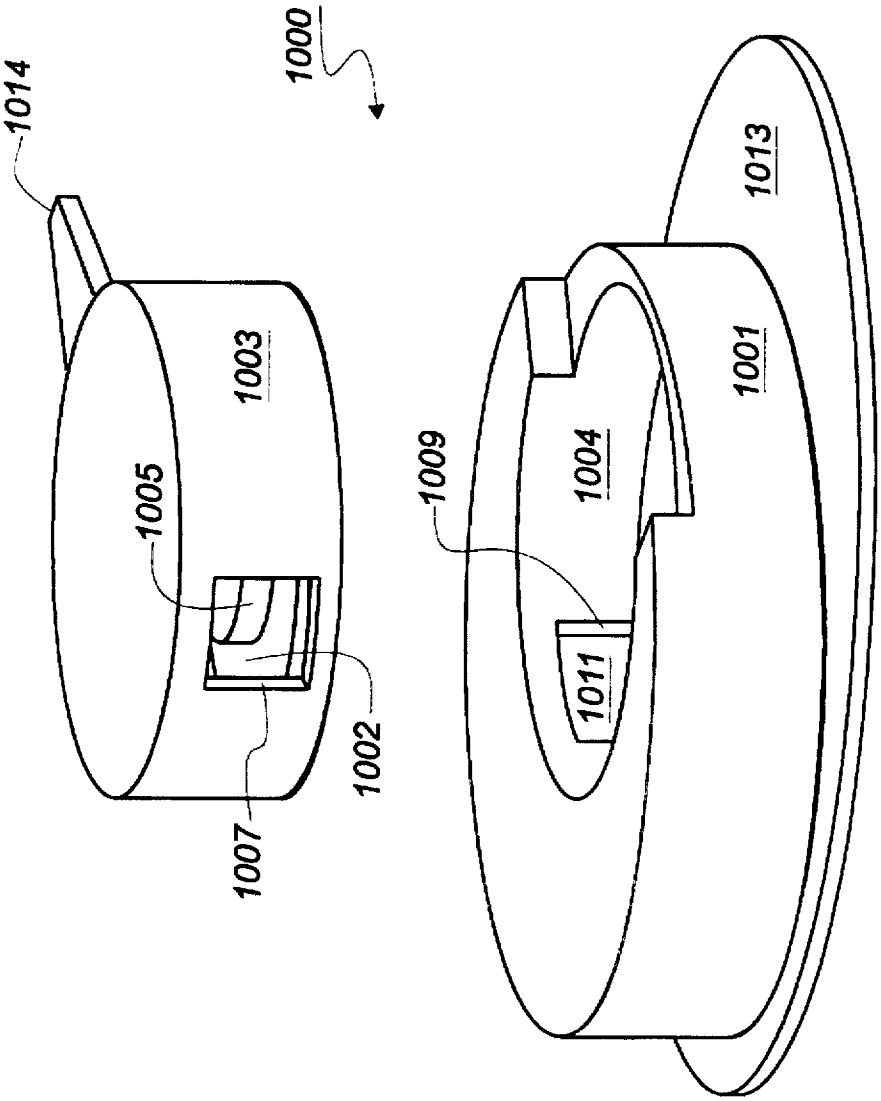
FIGS. 10*a* through 10*c* are illustrations of a headset housing using switched volumes.
Figure 10C:
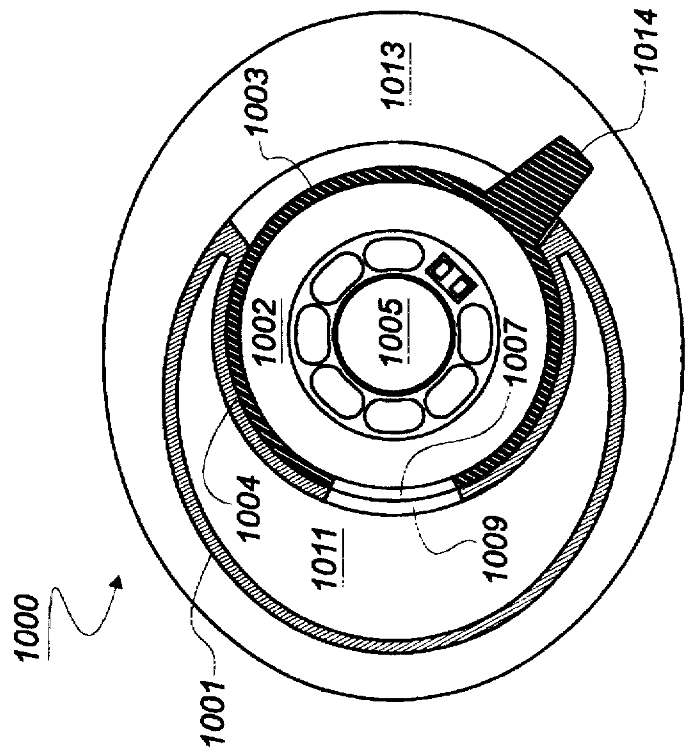
Figure 10B:
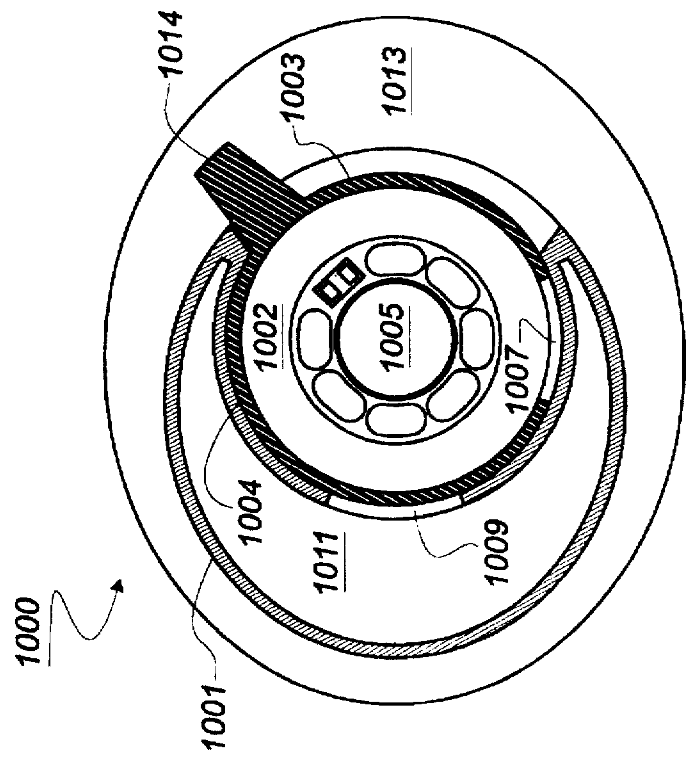

FIG. **10*b* shows a cross sectional top plan view of the housings. In this figure, the ports 1007, 1009 are not aligned, and the interior volume 1002 of the inner housing 1003 is relatively small. This produces lower compliance in the transducer 1005, and raises the resonant frequency of the overall headset 1000. As the inner housing 1003 is rotated within the circular opening 1004, the ports 1007, 1009 become aligned, as shown in FIG. 10*c*. Here the volume 1011 of the outer housing 1001 is coupled to the interior volume 1002, producing a lower resonant frequency for the headset 1000, and extended low frequency response. It is noted that FIGS. 10*a*–*c* merely illustrate the principle of switched volumes only. In an actual embodiment, detents, seals, and retaining structures would be added. Detents would allow the user to easily select bet-ween the open and closed positions. In addition, the single ports 1007 and 1009 can each be divided in multiple port pairs dispersed along the sides of the inner and outer housings. The resulting compliance variation will be the same so long as the total opening area of the multiple port pairs is the same as a given single port pair. Alternatively, a number of sets of ports 1009, each set having a different area of opening, can be provided, so that a set of ports 1007** on the inner housing may be aligned with any or none of them. This configuration would give the user a selection of various frequency responses.

While these variable volume enclosures have been shown as sealed volumes, it should be emphasized that they can be usefully employed in conjunction with switched or unswitched ports as described above.

The concept of acoustic switching allows the redirection of acoustic output through acoustic networks of arbitrary complexity which can be used either for transmission or loading. The embodiments described above show reasonably simple structures, and have been selected to illustrate some of the basic structural features and variations of the invention. However, some desirable acoustic responses may require more elaborate measures such as directing the acoustic output through a series of connected volumes to provide higher order filters. These and other variations of the foregoing applications are all within the scope of the present invention.

Several of the above embodiments have illustrated discrete acoustic switching using distinct elements for control over resistance and inductance. It is possible to combined resistive and inductive elements into more complex integrated control units that still provide for independent control of the resistance and damping factors of such elements. Referring now to FIGS. 12*a* through 12*f*, there is shown a consol device for incorporation in a headset for independently controlling the resistance and inductance of porting between acoustic volumes.

Figure 12A:
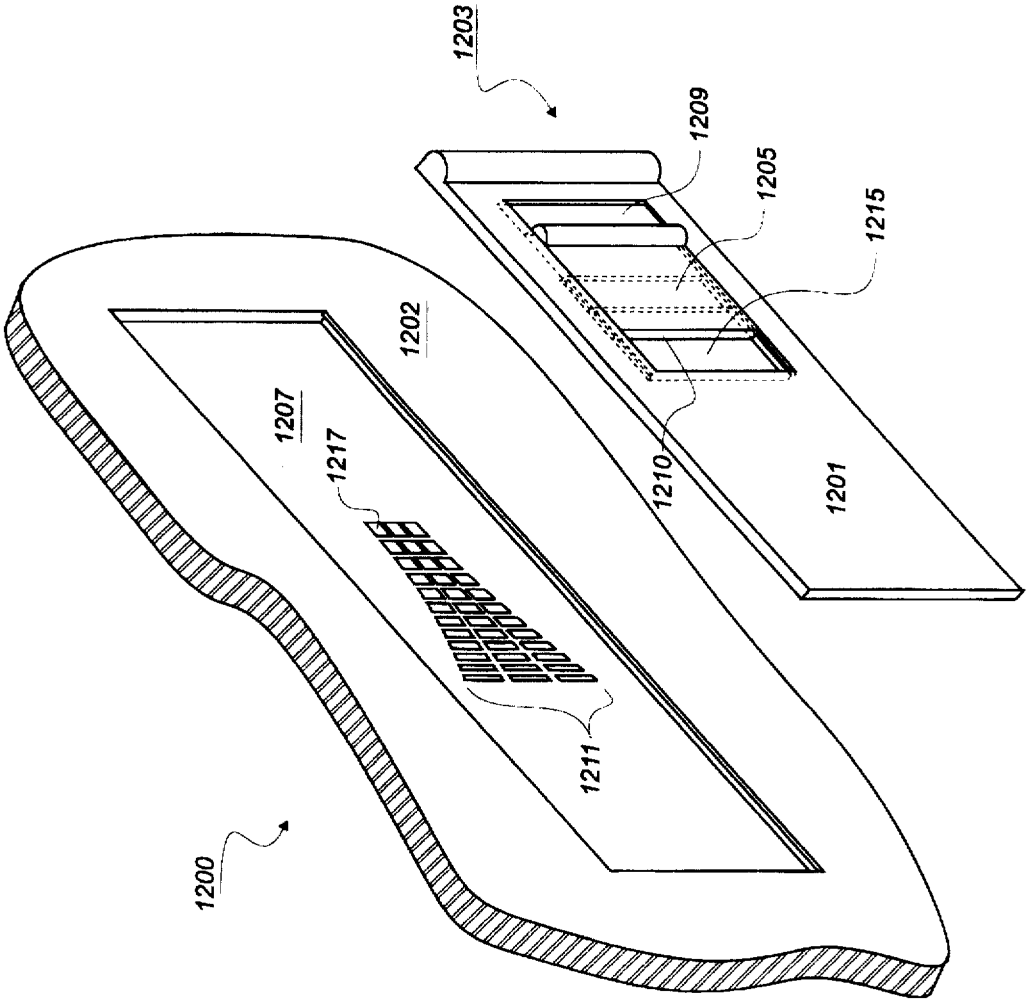
FIGS. 12*a* and 12*b* are illustrations of a portion of headset housing with independently adjustable inductance and resistance using a variable resistance grid.
Figure 12B:
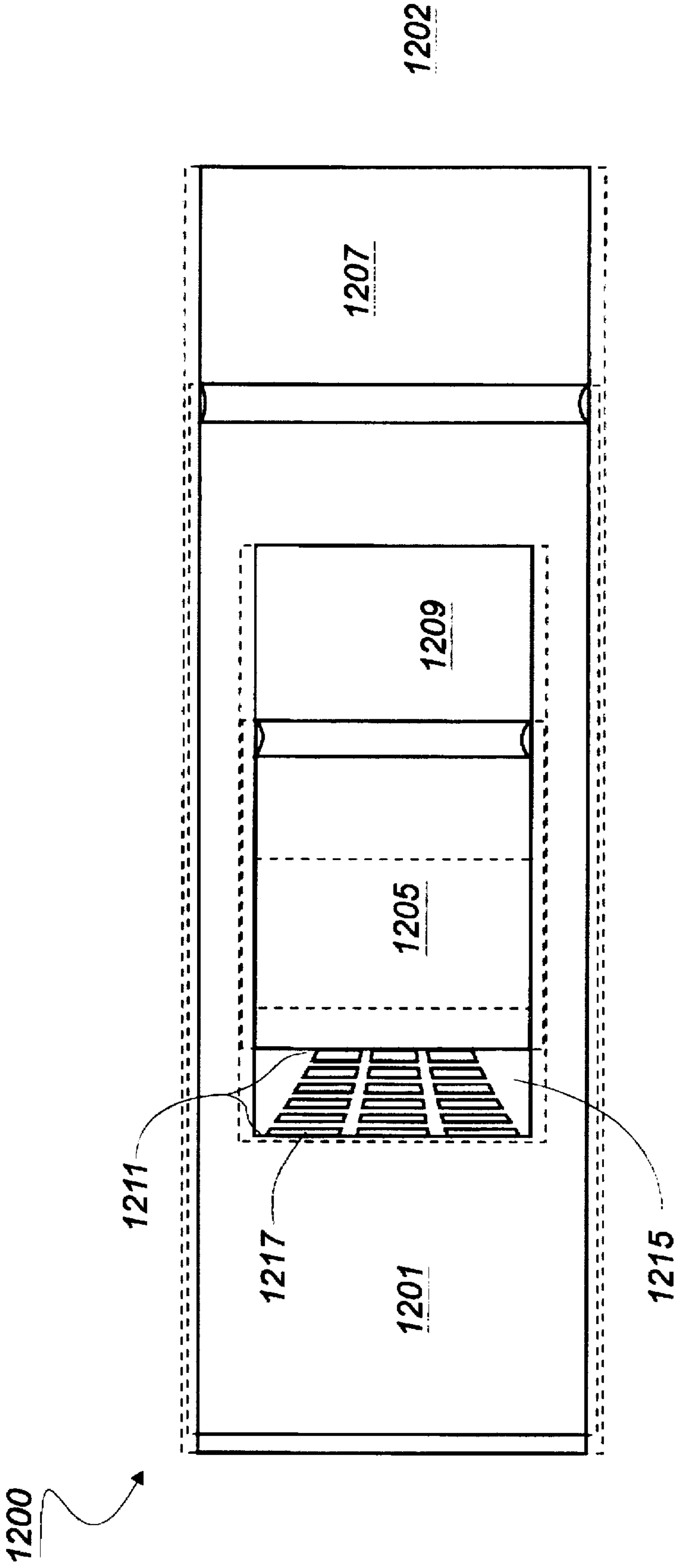

In FIG. 12*a*, an exploded, perspective view of the control device 1200 is shown. FIG. 12*b* illustrates plan view of the device 1200. The control device 1200 includes a body 1203 disposed in front of a variable resistance element 1211. The body 1203 is shown in FIG. 12*a* displaced from the damping control slot 1207 in order to show the location of the variable resistance element 1211 in the bottom of the slot. The variable resistance element 1211 is comprised of a plurality of openings 1217. The variable resistance element 1211 may be formed of mesh, perforated screen or consist of apertures molded directly into the wall of damping control slot 1207. The surface of the variable resistance element 1211 is in the same plane with the surface of the damping control slot 1207 to minimize lateral leakage. The openings 1217 have a varying width and height across the overall width of the variable resistance element 1211.

The body 1203 consists of two nested control slides. First, there is a damping control slot 1207 containing a damping control slide 1201. The damping control slide 1201 may be variably positioned in the damping control slot 1207. The damping control slide 1201 is used to adjust the relative position of a port 1215 maintained in the damping control slide 1201 in front of the variable resistance element 1211.

Within the body of the damping control slide 1201 is a port tuning slot 1209, and disposed in the slot 1209 is a port tuning slide 1205. The port tuning slide 1205 has an edge 1210 that slides on the surface of the damping control slot 1207 and variable covers portions of the variable resistance element 1211. The port tuning slide 1205 may be variably positioned in the port tuning slot 1209, to adjust the width of the port 1215. The width of the port 1215 determines the amount of inductance between acoustic volumes on either side of the variable resistance element 1211, by controlling the total cross-sectional area of the uncovered openings in the element 1211. The relative position of the port 1215 in front of the variable resistance element 1211 determines the amount of resistance in the transmission path by determining which openings in the element 1211 are uncovered at a given position, where resistance is a function of the width of each of the uncovered openings. The openings 1217 are sized and positioned so that for any given width of the port 1215 the total open area presented by the openings 1217 is the same at any position of the port 1215 along the element 1211.

Referring now to FIGS. 12*c* through 12*f*, there is shown examples of the independent control of resistance and inductance of the control device 1200. In these figures, there is shown only the variable resistance element 1211, and the relative size and position of the port 1215 with respect to the element 1211. The figures are arranged such that inductance is constant between vertical pairs of figures (12*c*, 12*e*, and 12*d*, 12*f*), and variable between lateral pairs (12*c*, 12*d*, and 12*e*, 12*f*), and resistance is constant laterally, and variable vertically.

The action of the control is not completely symmetrical, as increasing the width of port 1215 decreases both resistance and inductance. To reestablish a higher value of resistance, the damping control slide 1201 is moved to the left in the damping control slot. Once the width of the port 1215 is established via the port tuning slide 1205 however, the resistance may be varied without readjusting the inductance simply by moving the damping control slide 1201.

Figures 12C, 12D, 12E, 12F:
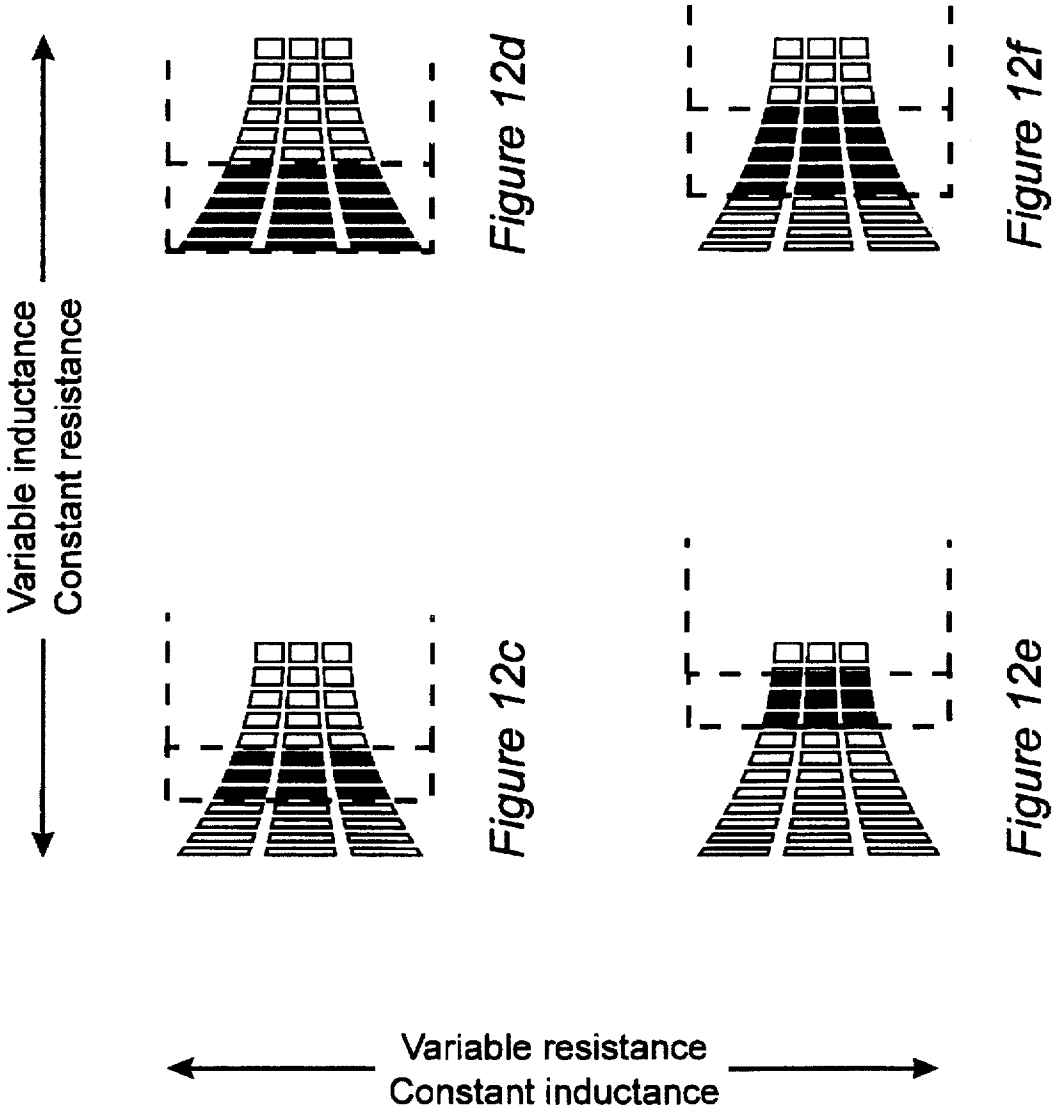
FIGS. 12*c* through 12*f* are illustrations of various positions of headset housing of FIGS. 12*a* and 12*b*.

More particularly then, in FIG. 12*d* the port 1215 is positioned at the extreme left side of the variable resistance element 1211 and is opened to a first width. In FIG. 12*c* the port 1215 is opened to a second width and positioned closer to the center of the variable resistance element 1211. The resistance of these positions is constant because the larger surface area of the wider opening is offset by the decrease in the size of the individual openings 1217 that comprise that area. The narrower port 1215 of FIG. 12*c* is positioned over an area where the individual openings 1217 are larger, thus presenting less resistance per unit area. Inductance is varied between the two positions because of the difference in the width of port 1215 which increases the total open area of the port 1215. Since the inductance is only slightly affected by the size of the individual openings 1217 and the overall area is unaffected by the position of the port, inductance is unaffected by the position of port 1215. Similarly in FIGS. 12*e* and 12*f* the normal tendency for the larger port 1215 to have lower resistance is offset by the difference in port position on the variable resistance element 1211.

With respect to FIGS. 12*c* and 12*e*, the inductance between these configurations of the port 1215 is constant because even though the port 1215 is positioned in two different locations, the width of the port 1215 is the same. However, the resistance provided in FIG. 12*e* is less than in FIG. 12*c* because of larger area presented by each opening in the variable resistant element 1211.

We claim:

1. A headset comprising:

a transducer having first and second surfaces, the first surface acoustically coupled to an air volume in the ear canal;

a housing having a first interior volume coupled to the second surface of the transducer, and further having a first port to the first interior volume;

a covering movably coupled to the housing and having a second port to the air volume exterior to the first interior volume, the covering having:

a user selectable first position with respect to the housing where the second port communicates with the first port to couple the first interior volume to the air volume in the ear canal such that acoustic energy from both the first and second surfaces of the transducer is provided to the ear canal, producing a first predetermined frequency response for the headset; and a user selectable second position with respect to the housing where the first port does not communicate with the second port, and the first interior volume is sealed with respect to the air volume in the ear canal, such that acoustic energy from only the first surface of the transducer is provided to the ear canal, producing a second predetermined frequency response for the headset that is perceptually different from the first predetermined frequency response.

2. A headset comprising:

a transducer having first and second oppositely disposed surfaces;

a housing having:

a first interior volume coupled to the first surface of the transducer, and further having a first port to the first interior volume;

a second interior volume coupled to the second surface of the transducer, the second interior volume separate from but acoustically coupled to, an ear canal volume in the ear canal; and, a covering movably coupled to the housing and having a second port to the ear canal volume exterior to the first interior volume, the covering having:

a user selectable first position with respect to the housing where the second port communicates with the first port to couple the first interior volume on one side of the transducer to the second interior volume on the opposite side of the transducer such that acoustic energy from both the first and second surfaces of the transducer is provided to the second interior volume and the ear canal volume, producing a first predetermined frequency response for the headset; and a user selectable second position with respect to the housing where the first port does not communicate with the second port, and the second interior volume is sealed with respect to the first interior volume, such that acoustic energy from only the second surface of the transducer is provided to the second interior volume and the ear canal volume, producing a second predetermined frequency response for the headset that is perceptually different from the first predetermined frequency response.

3. A headset comprising:

a transducer;

a housing having:

a first volume communicating with a first side of the transducer;

at least one first port to the first volume;

a second volume external to the first volume and communicating with a second side of the transducer;

at least one second port to the second volume;

a covering movably disposed on the housing, and having at least two positions with respect to the housing, and including:

at least one third port that variably communicates with the first port, in correspondence with a position of the covering, to alter a first portion of a frequency response of the housing by alteration of housing resonance;

at least one fourth port that variably communicates with the second port, in correspondence with a position of the covering to alter a second portion of the frequency response by alteration of a transmission path from the transducer.

* * * * *